(12) United States Patent
Bhalla

(10) Patent No.: US 10,616,048 B2
(45) Date of Patent: Apr. 7, 2020

(54) RESOURCE AND ATTRIBUTE MANAGEMENT IN MACHINE TO MACHINE NETWORKS

(71) Applicant: ZTE Corporation, Shenzhen (CN)

(72) Inventor: Rajesh Bhalla, Gahanna, OH (US)

(73) Assignee: ZTE Corporation, Shenzhen (CN)

( * ) Notice: Subject to any disclaimer, the term of this patent is extended or adjusted under 35 U.S.C. 154(b) by 13 days.

(21) Appl. No.: 15/126,951

(22) PCT Filed: Mar. 18, 2015

(86) PCT No.: PCT/US2015/021336
§ 371 (c)(1),
(2) Date: Sep. 16, 2016

(87) PCT Pub. No.: WO2015/143086
PCT Pub. Date: Sep. 24, 2015

(65) Prior Publication Data
US 2017/0099562 A1    Apr. 6, 2017

Related U.S. Application Data

(60) Provisional application No. 61/955,180, filed on Mar. 18, 2014, provisional application No. 61/974,923, (Continued)

(51) Int. Cl.
*G06F 15/173* (2006.01)
*H04L 12/24* (2006.01)
(Continued)

(52) U.S. Cl.
CPC .......... *H04L 41/0803* (2013.01); *H04L 67/12* (2013.01); *H04L 67/16* (2013.01); *H04W 4/50* (2018.02); *H04W 4/70* (2018.02)

(58) Field of Classification Search
CPC .. H04W 4/005; H04W 4/001; H04L 41/0803; H04L 67/12; H04L 67/16
(Continued)

(56) References Cited

U.S. PATENT DOCUMENTS

2003/0074453 A1 * 4/2003 Ikonen ............... H04L 29/06
709/228
2005/0066194 A1 * 3/2005 Campbell ............ G06Q 30/04
726/4
(Continued)

FOREIGN PATENT DOCUMENTS

CN    103299601    9/2013
CN    103621113    3/2014
(Continued)

OTHER PUBLICATIONS

J. Swetina, G. Lu, P. Jacobs, F. Ennesser and J. Song, "Toward a standardized common M2M service layer platform: Introduction to oneM2M," in IEEE Wireless Communications, vol. 21, No. 3, pp. 20-26, Jun. 2014. (Year: 2014).*
(Continued)

*Primary Examiner* — Taylor A Elfervig
(74) *Attorney, Agent, or Firm* — Perkins Coie LLP

(57) ABSTRACT

In a machine to machine (M2M) system, resource management is performed by M2M devices by creating resources, announcing resources, retrieving information from an announced resource, deleting an announced resource, on behalf of the devices themselves, or on behalf of another device. In some embodiments, resource management protocols are further provided to include a child resource attribute that provides efficiency of protocol signaling by inheriting certain features if a parent resource from which the child resource attribute is derived.

15 Claims, 15 Drawing Sheets

Related U.S. Application Data filed on Apr. 3, 2014, provisional application No. 61/983,411, filed on Apr. 23, 2014, provisional application No. 62/005,961, filed on May 30, 2014.

(51) Int. Cl.
  *H04L 29/08* (2006.01)
  *H04W 4/50* (2018.01)
  *H04W 4/70* (2018.01)

(58) Field of Classification Search
  USPC .......................................................... 709/223
  See application file for complete search history.

(56) References Cited

U.S. PATENT DOCUMENTS

| | | | |
|---|---|---|---|
| 2012/0044865 A1 | 2/2012 | Singh et al. | |
| 2012/0131168 A1 | 5/2012 | Foti | |
| 2013/0179557 A1 | 7/2013 | Bian et al. | |
| 2013/0203394 A1* | 8/2013 | Dong ............... | H04W 4/005 455/414.1 |
| 2013/0336222 A1* | 12/2013 | Lu ................... | H04W 4/005 370/328 |
| 2015/0244776 A1* | 8/2015 | Pareglio ........... | H04W 4/005 709/204 |
| 2016/0302085 A1* | 10/2016 | Park ................. | H04L 67/303 |

FOREIGN PATENT DOCUMENTS

| | | | |
|---|---|---|---|
| JP | 2014-505382 A | 2/2014 | |
| JP | 2014-506764 | 3/2014 | |
| WO | 2012/068465 A1 | 5/2012 | |
| WO | 2012/109531 A2 | 8/2012 | |
| WO | 2013/106188 A2 | 7/2013 | |
| WO | 2013/176425 A1 | 11/2013 | |
| WO | 2013/179557 | 12/2013 | |
| WO | 2014/037054 | 3/2014 | |

OTHER PUBLICATIONS

C. Eichler, G. Gharbi, N. Guermouche, T. Monteil and P. Stolf, "Graph-Based Formalism for Machine-to-Machine Self-Managed Communications," 2013 Workshops on Enabling Technologies: Infrastructure for Collaborative Enterprises, Hammamet, 2013, pp. 74-79. (Year: 2013).*

A. Elmangoush, T. Magedanz, A. Blotny and N. Blum, "Design of RESTful APIs for M2M services," 2012 16th International Conference on Intelligence in Next Generation Networks, Berlin, 2012, pp. 50-56. (Year: 2012).*

International Search Report and Written Opinion dated Jun. 16, 2015 for International Application No. PCT/US2015/021336, filed on Mar. 18, 2015 (11 pages).

European Search Report dated Oct. 16, 2017 for European Application No. 15765445.0, filed on Mar. 18, 2015 (8 pages).

Japanese Office Action dated Nov. 28, 2017 for Japanese Application No. 2017-501103, filed on Mar. 18, 2015 (4 pages).

OneM2M Functional Architecture Baseline Draft, oneM2M-TS-0001-V-0.4.2, Mar. 4, 2014.

Chinese Office Action dated Feb. 27, 2019 for Chinese Application No. 201580026608.4, filed Mar. 18, 2015 (6 pages).

* cited by examiner

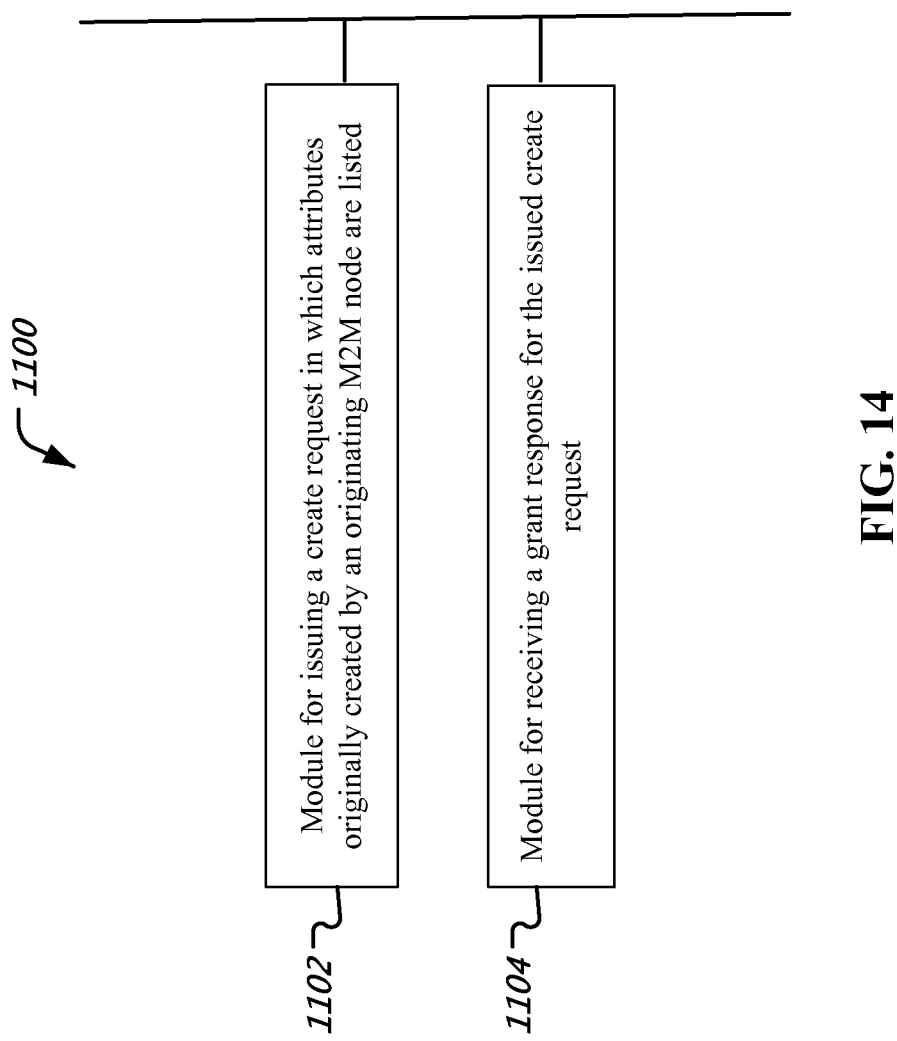

RESOURCE AND ATTRIBUTE MANAGEMENT IN MACHINE TO MACHINE NETWORKS

CROSS REFERENCE TO RELATED APPLICATIONS

This patent document claims the benefit of priority of U.S. Provisional Patent Application No. 61/955,180, filed Mar. 18, 2014; U.S. Provisional Patent Application No. 61/974,923, filed Apr. 3, 2014; U.S. Provisional Patent Application No. 61/983,411, filed Apr. 23, 2014; and U.S. Provisional Patent Application No. 62/005,961, filed May 30, 2014. The entire content of the before-mentioned patent applications is incorporated by reference as part of the disclosure of this document.

BACKGROUND

This patent document relates to communications, including machine type communications (MTC) and machine to machine (M2M) communications.

In many applications, wireless devices operating in a wireless network communicate with other devices and servers that are not operating in the wireless network but can be communicatively reachable. Various standards are available to provide such connectivity to wireless devices. For example, the Internet Protocol (IP) is one such framework by which a wireless device can be communicatively coupled with other devices, based on an IP address assigned to the wireless devices.

Certain operational cases, such as in systems that include machine type communications (MTC) and machine to machine (M2M) communications wireless devices, may lack the framework for IP connectivity.

SUMMARY

This document describes technologies, among other things, for facilitating communication between M2M devices. Using the disclosed techniques, in some embodiments, resources can be created by an M2M device, made known to other M2M devices, and deleted by an M2M device.

In one example aspect, techniques for retrieving information from an announced attributes in an M2M communication system include issuing an information retrieval request by specifying an address of the announced attribute and including an identity of the announced attributes, receiving, in response to the information retrieval request, an information response, and selectively processing the received information response locally or forwarding to another M2M device for further processing.

In another example aspect, techniques for deleting an announced attributes in an M2M communication system include creating a list of attributes of the resource in which an attribute to be deleted is omitted, and transmitting the list to an M2M node that hosts the attribute to be deleted.

In another example aspect, techniques for creating announced resources in an M2M communication system include issuing a create request in which attributes originally created by an originating M2M node are listed, and receiving a grant response for the issued create request.

These and other aspects, and their implementations and variations are set forth in the drawings, the description and the claims.

BRIEF DESCRIPTION OF THE DRAWINGS

FIG. 14 is a block diagram representation of an example of a M2M communication apparatus.

DETAILED DESCRIPTION

Figure 1:
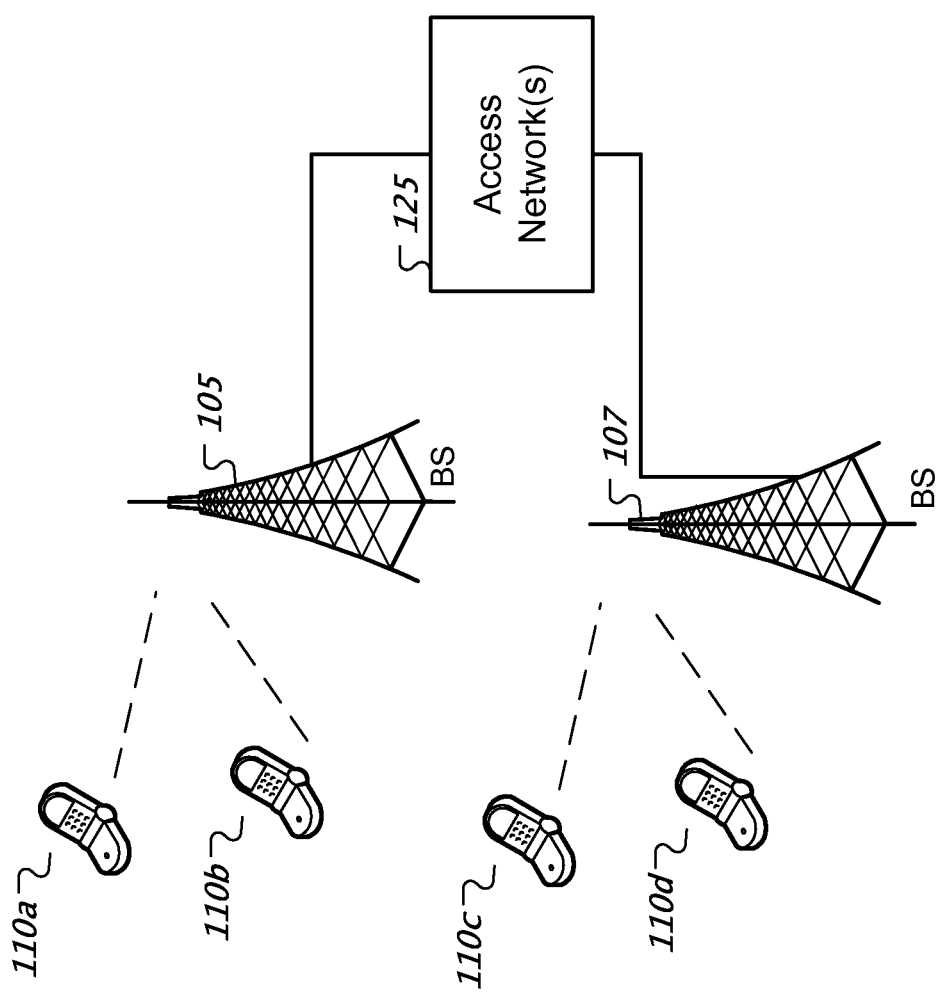
FIG. 1 depicts an example of a wireless network architecture.

In Machine to Machine communication (M2M), communication between two devices may be triggered automatically, i.e., without active participation by a human user. For example, M2M communication may be started on a time boundary, e.g., once every week or upon occurrence of a certain event (e.g., measuring precipitation recorded by machines after rainfall). Devices participating in M2M communication may be powered down or in sleep mode (no communication with other devices) for long durations (e.g., few hours to few months). As a result of the long sleep cycles by M2M devices, operational parameters such as resources at communication end points may have changed between two awake cycles of a device. Further, M2M devices are often battery operated and it may be beneficial to conserve battery life so that these devices do not have to be serviced for battery changing.

M2M devices may be equipped with certain resources. Examples of resources include memory, computational power, sensors, connectivity to a different network, energy storage capability, display resources, and so on. Each resource may have a corresponding set of attributes used to describe the resource. In terms of communication messages, resources may represent data structures used to describe an M2M device while individual elements of the data structure may be considered the attributes. The resources available locally to an M2M device may change from time to time, sometimes while the M2M device is in sleep mode and not communicating with other M2M device. For example, storage capacity may get added to a video surveillance camera while being off-line. As another example, an on/off type light bulb may be replaced with a dimmable light bulb, thereby providing it resources to adjust illumination. Similarly, resources may get taken away or deleted from an M2M device.

Providing other M2M devices with an up-to-date snapshot of available resources may be cumbersome for some M2M devices because resource management may consume battery power (e.g., for computation and/or communication). Further, some M2M devices may be hard to reach by a human or may not have a local user interface and may be remotely managed. Application servers may, from time to time, want to know attributes of resources available on M2M devices. For M2M devices that are not currently communicating, this information may be gathered by (1) the application server waking up an M2M device and querying its attributes or (2) by reading a shadow copy or a clone copy of the attributes of the M2M device kept at another device (e.g., a gateway device) in the network, where this device is communicatively reachable.

The latter method provides certain benefits to M2M communication because queries from application servers, which could be under control of multiple service providers, need not awaken individual M2M devices, thus saving batter power and communication bandwidth in a network. The total number of attributes of an individual M2M device may run into hundreds of entries, thus using several Kilobytes or Megabytes (e.g., 8 Kbytes to 4 Mbytes) of bandwidth and storage space for saving a clone copy or a shadow copy of all attributes. Application servers often do not need all attribute values for M2M devices. Therefore, synching up attributes of an M2M device with its shadow copy may un-necessarily consumer transmission time, power and bandwidth.

Present-day M2M communication systems and protocols fail to adequately address operational situations that arise in M2M communication systems. The techniques disclosed in the present document can be used to, among other things, provide for resource efficient creation, advertisement and deletion of attributes in an M2M communication system, to the benefit of multiple service providers.

The End-to-End (E2E) view of M2M ecosystem comprises of M2M Applications hosted by the M2M Application Server (AS) and the M2M Devices/Gateways. In this E2E view, the M2M Service Platform provides services such as Data Management, Device Management, Service Enablement capabilities etc. The underlying Transport Network provides transport and communication services for the data flow between the M2M Applications hosted by the M2M Devices/Gateways and the Application Server(s).

The following set of definitions are taken from the specifications being developed by oneM2M.

Application Function (AF): Provides Application logic for the end-to-end M2M solutions. Examples of the Application Functions can be fleet tracking application, remote blood sugar monitoring application, or remote power metering and controlling application.

Application Layer: Comprises of M2M Applications and related business and operational logic.

Common Services Entity (CSE): The Common Services Entity is a collection of Common Service Functions. Common Services Entity at an M2M Node provides a set of services that are used by M2M Applications at that M2M Node or to access services from another M2M Node. The Common Services Entity can utilize the underlying network capabilities and can interact with each other to fulfill the services.

Common Services Function (CSF): The comprises of a set of services/capabilities that are offered by an M2M Node to other entities in the M2M System. Such services/capabilities are exposed to other Common Service Functions (CSFs) through Reference Points X and Y in an M2M System based on oneM2M specifications. Common Service Functions use Reference point Z for accessing Underlying Network Services as well. Examples of such CSF are: Data Management & Repository, Device Management and M2M Session Management etc.

Common Services Layer: Consists of M2M service functions that enable M2M applications (via management, discovery and policy enforcement to name a few).

Network Services Layer: Provides transport, connectivity and service functions.

M2M Application: Applications that run the service logic and use M2M Common Services accessible via a set of oneM2M specified open interfaces.

M2M Application Service Provider: An entity (e.g. a company) that provides M2M Application Services to the User.

M2M Device: Equipment providing sensing and/or actuation services. An M2M Device hosts one or more M2M Applications and may contain one or more CSEs. An M2M Device may, but does not need to, be co-located with Sensing&Actuation Equipment.

M2M Gateway: Equipment that contains one or more CSEs and may contain M2M Applications. An M2M Gateway communicates with M2M Service Infrastructure and one or more M2M Devices.

M2M Node: A logical entity that consists of CSE(s) and/or M2M Application(s) to represent M2M physical entities such as M2M Devices, M2M Gateways, and M2M Service Infrastructure.

M2M Service Infrastructure: Equipment that provides management of data and coordination capabilities for the M2M Service Provider and communicates with M2M Devices and/or M2M Gateways. M2M Service Infrastructure contains one or more CSEs.

M2M Service Provider: An entity (e.g. a company) that provides M2M Services to a M2M Application Service Provider or to the User.

Underlying Network Services Function (NSF): Underlying Network Services Function provides services to the CSEs from entities external to an M2M Node. Examples of such services include Device Management, Location Services, Device Reachability Status, Device Triggering etc.

Sensing and Actuation (S&A) Equipment: equipment that provides functionality for sensing and/or influencing the physical environment by interacting with one or more M2M Application Services. Sensing and Actuation Equipment can interact with the M2M System, however does not host an M2M Application. S&A Equipment may, but does not need to, be co-located with an M2M Device.

X Reference Point

Reference point between an M2M Application and a CSE. The X reference point allows an M2M Application to use services provided by the CSE, and for the CSE to communicate back with the M2M Application.

Y Reference Point

Reference point between two CSEs. The Y reference point allows a CSE to use services of another CSE to fulfill the needed functionality.

Z Reference Point

Reference point between a CSE and the underlying network. The Z reference point allows a CSE to use the services (other than transport and connectivity services) provided by the underlying network to fulfill needed functionality.

With such E2E view of M2M services, the M2M Application Server, M2M Devices/Gateways, the M2M Service Platform and the Transport Network can be considered as different entities in the E2E M2M Services framework. Each of these entities can also be considered as a representation of different business entities. For example, the M2M Application Service Provider is a business entity (e.g., a Company) that provides M2M Application Services to the end User. M2M Service Provider (SP) is another business entity (e.g., a Company) that provides M2M Service Platform for use by the M2M Application Service Provider for realizing the services from the M2M Devices/Gateways which may be integrated with Sensing and Actuation (S&A) equipment. The underlying Network Services Provider provides the underlying transport network that could be based on wireline and/or wireless technologies such as those being defined by IEEE, IETF, 3GPP, 3GPP2, BBF etc.

Within the M2M services framework, the M2M Devices/Gateways may host Applications that are specific by different M2M Service Providers (SPs). For example, considering the case of a Smart Home that has S&A equipment for supporting services such as Energy Management, Home Security, Health Monitoring etc. Such services (energy management, home security, health monitoring etc.) are provided by different M2M Service Providers. Yet all these services are hosted in the Smart Home on a single Home Gateway, by the use of S&A equipment for different services. In this service scenario, the Home Gateway is typically be owned by the home-owner, whereas the S&A equipment is services-specific (who owns the S&A equipment is not the subject of discussions of this paper). For example, the S&A equipment for energy management services and health monitoring services is specific to the services being provided, and may require to be managed by the respective M2M Service Providers (Energy Management and Health Monitoring Service Providers in this case). Similarly, M2M Service Providers may want to manage their respective set of operational environment on the Home Gateway independent of other M2M Service Providers. For example, the Energy Management Service Provider may want to update the energy monitoring software/firmware installed on the Home Gateway. Such updates, however, should not affect the services provided by the Health Monitoring Service Provider. It is also very likely that while providing such diverse set of services, the Home Gateway needs to provide a secure environment for segregating the services being provided different M2M Service Providers.

FIG. 1 shows an example of a wireless communication network or system. This wireless communication network can include one or more base stations (BSs) 105, 107 and one or more wireless devices 110. A base station 105, 107 can transmit a signal on a forward link (FL), known as a downlink (DL) signal, to one or more wireless devices 110. A wireless device 110 can transmit a signal on a reverse link (RL), known as an uplink (UL) signal, to one or more base stations 105, 107. A wireless communication system can include one or more core networks 125 to control one or more base stations 105, 107. One or more base stations form a radio access network. A base station, due to its nature of providing radio access for a wireless device, either alone or in combination with one or more other base stations, can be referred to as an access point (AP), an access network (AN) or eNodeB. Examples of wireless communication systems that can implement the present techniques and systems include, among others, wireless communication systems based on Code division Multiple Access (CDMA) such as CDMA2000 1x, High Rate Packet Data (HRPD), Long-Term Evolution (LTE), Universal Terrestrial Radio Access Network (UTRAN), and Worldwide Interoperability for Microwave Access (WiMAX).

Figure 2:
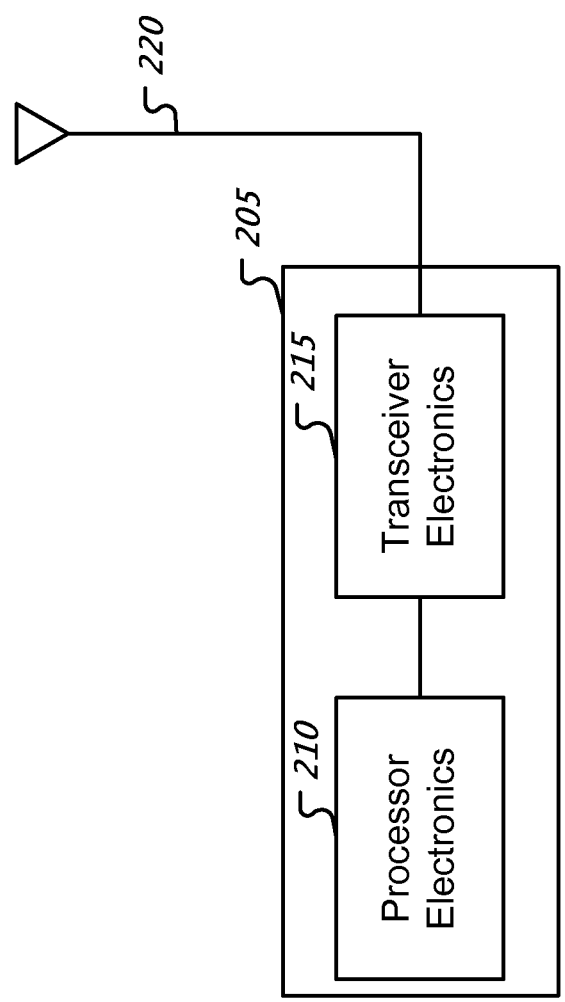
FIG. 2 is a block diagram of an example of a radio device operable in a wireless network.

FIG. 2 shows an example of a radio transceiver station for implementing a wireless device, a base station or other wireless communication modules. Various examples of radio stations include base stations and wireless devices in FIG. 1. A radio station 205 such as a base station or a wireless device can include processor electronics 210 such as a microprocessor that implements methods such as one or more of the techniques presented in this document. A radio station 205 can include transceiver electronics 215 to send and/or receive wireless signals over one or more communication interfaces such as one or more antennas 220. A radio station 205 can include other communication interfaces for transmitting and receiving data. In some implementations, a radio station 205 can include one or more wired communication interfaces to communicate with a wired network. A radio station 205 can include one or more memories 225 configured to store information such as data and/or instructions. In some implementations, processor electronics 210 can include at least a portion of transceiver electronics 215 and a memory 225.

In some implementations, radio stations 205 can communicate with each other based on a CDMA or GSM based air interface. In some implementations, radio stations 205 can communicate with each other based on an orthogonal frequency-division multiplexing (OFDM) air interface which can include Orthogonal Frequency-Division Multiple Access (OFDMA) air interface. In some implementations, radio stations 205 can communicate using one or more wireless technologies such as CDMA2000 1x, HRPD, WiMAX, GSM, LTE, and Universal Mobile Telecommunications System (UMTS).

In some implementations, a radio station 205 may additionally be configured with a local area network connectivity such as a 802.11 (a/b/g/n) interface. The availability of such an interface may make it possible to communicatively couple the radio station 205 to the Internet via the local area connection. For example, a user may access services over her user equipment (UE) by connecting to the service via a wireless local area network connection (e.g., home Wi-Fi access) through a fixed broadband network such as a cable modem network or a DSL network. The above described radio station 205 may be used to implement techniques disclosed in the present document. Similarly, another entity or module communicatively coupled to the access network 125 (e.g., a core or a backbone network or an application server coupled thereto) may implement some disclosed techniques.

First Example Embodiments of Deployment into one M2M System

The techniques described in the present document can be embodied in implementations that can be deployed to interoperate with devices that follow the one M2M specification, a currently released version of which is explained as follows as one example.

The following abbreviations are used in this document.
ADN: Application Dedicated Node.
ADN-AE: AE which resides in the Application Dedicated Node.
AE: Application Entity.
App: Application.
ASN: Application Service Node.
ASE-AE: Application Entity that is registered with the CSE in the Application Service Node.
ASN-CSE: CSE which resides in the Application Service Node.
BBF: Broadband Forum.
CSE: Common Service Entity.

CSF: Common Service Function.

EF: Enabler Function.

IEEE: Institute of Electrical and Electronics Engineers.

IETF: Internet Engineering Task Force.

IN: Infrastructure Node.

IN-AE: Application Entity that is registered with the CSE in the Infrastructure Node.

IN-CSE: CSE which resides in the Infrastructure Node.

JNI: Java Native Interface.

LTE: Long Term Evolution.

MAC: Medium Access Control.

M2M: Machine to machine.

MN: Middle Node.

MN-CSE: CSE which resides in the Middle Node.

NSE: Network Service Entity.

SDO: Standards development organization.

SP: Service Provider.

UNet: Underlying network (in which an M2M device resides).

In Machine-to-Machine (M2M) communication, two devices, e.g., an application server and an M2M capable device, may communicate with each other without a human user explicitly initiating the communication. In M2M communications, the two endpoints between which communication occurs often are in different networks. In a typical application scenario, one endpoint may be a sensor or a utility box that may go offline for extended time periods and another endpoint may be an application server such as a utility billing server or an M2M server that may be deployed in a managed network. Data packets traveling back and forth between these two end points may be routable via various routing options. For example, one endpoint may have connectivity over a licensed spectrum (e.g., Long Term Evolution) or an unlicensed spectrum (e.g., Wi-Fi). When one endpoint is offline for extended time periods, e.g., days or weeks, the way in which packets were routed to that end point during a last communication session may not necessarily the way in which the packets can be routed in a current communication session. Furthermore, various routing options may incur various costs (e.g., bandwidth charges or power dissipation during transmission).

In order to save power or other resources, some M2M devices or application entities running on these devices may go "offline" from time to time. To re-establish an application layer communication, these M2M entities may be to be awaken prior to the communication. The manner in which triggering is performed or the exact module or entity that can be woken up may depend on configuration and capabilities of individual M2M devices.

Service Layer specifications developed by organizations such as oneM2M, ETSI TC M2M, TIA TR-50 etc.(M2M SDOs) need to support efficient deployment of M2M solutions by a wide range of market-focused (vertical) organizations. With the focus on the service layer, such organizations have been taking transport network-independent view of the end-to-end services. Yet, they need to make sure that their service layer specifications can be used effectively for interfacing with different types of transport networks. Such transport networks include but are not limited to the wireless and wireline networks being defined by 3GPP, 3GPP2, IEEE, IETF and BBF.

In the service layer specification, currently, there is now way for a service request to identify a particular M2M device associated with the entity that holds the common service resources to fulfil the M2M request. Furthermore, when a sleeping M2M device may have to be triggered to awaken to fulfil an M2M communication request, current systems are limited in way by which a triggering device to which the request may have to be routed is specified. The techniques presented in this document solve these problems, and others.

Figure 3:
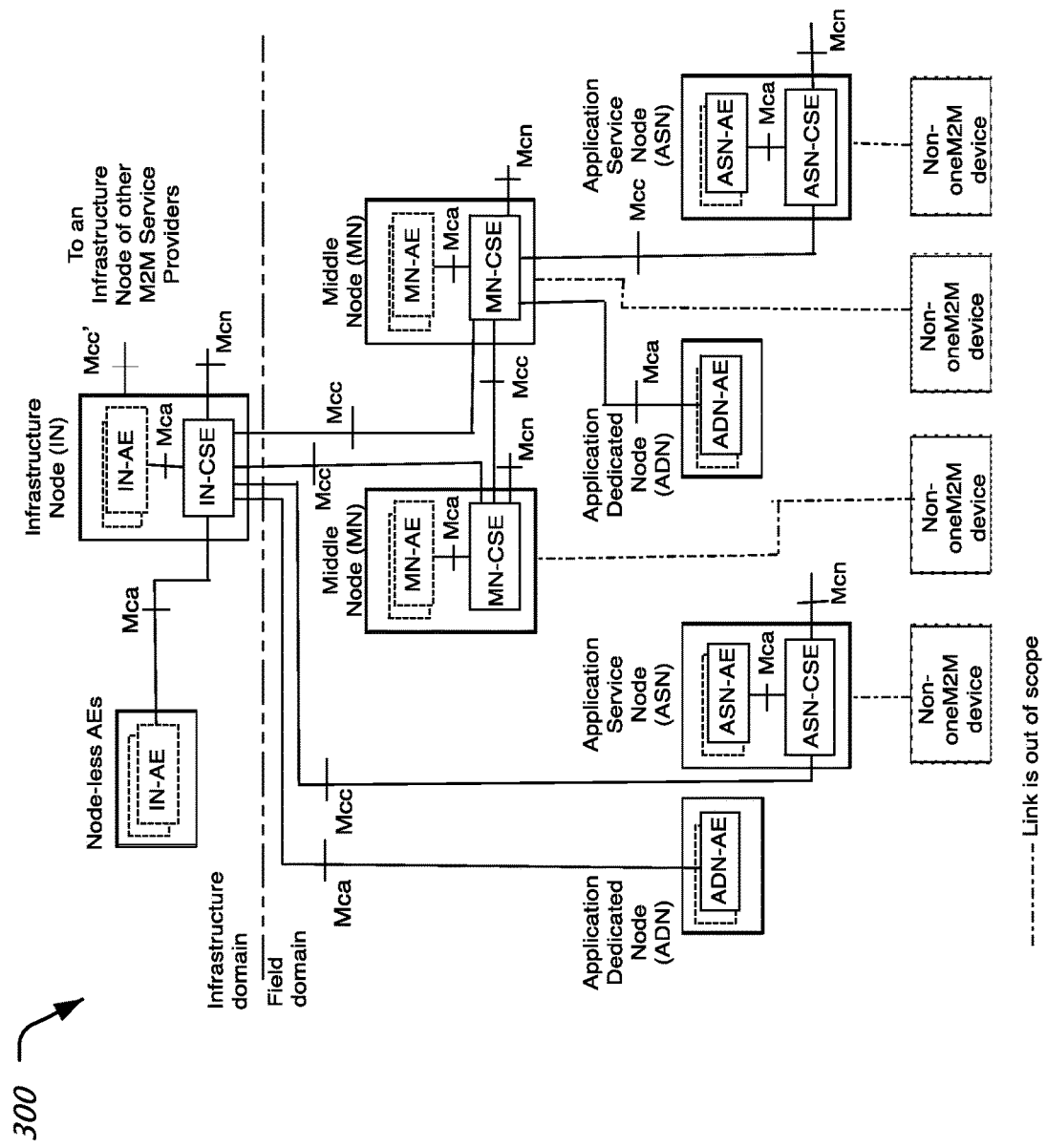
FIG. 3 shows an exemplary architecture of an M2M communication system.

FIG. 3 illustrates some possible configurations 300 supported by a oneM2M System. FIG. 3 is an extract from the Functional Architecture specification being developed by oneM2M.

In this example illustration 300, Application Entities (AEs) on ADN (ADN-AEs) may register with IN-CSE. Similarly Node-less AEs can register with IN-CSE. ADN-AEs may register with MN-CSE as well. Such registrations are registrations between AEs and CSEs at remote entities/Nodes.

A CSE is an instantiation of one or more CSFs. A CSE provides a subset of CSFs that could be used and shared by M2M Applications. A CSE can utilize UNet capabilities and can interact with other CSEs to fulfil the service. A CSE comprises the set of "service functions" that are common to the M2M environments. Such service functions are exposed to other entities through Reference Points such as the Mca and Mcc reference points specified in oneM2M (see FIG. 3). The Mcc reference point defines communication flows between CSEs. The reference point Mcn is used for accessing Underlying Network Service Entities. Examples of service functions offered by CSE are: Data Management, Device Management, M2M Subscription Management, Location Services etc. Such "subfunctions" offered by a CSE may be logically apprehended as Common Services Functions (CSFs). Inside a Common Services Entity (CSE), some of the CSFs can be mandatory and others can be optional. Also, inside a CSF, some subfunctions can be mandatory or optional (e.g., inside a "Device Management" CSF, some of the subfunctions like "Application Software Installation", "Firmware Updates", "Logging", "Monitoring", etc. can be mandatory or optional).

A CSF is a set of service functions that are common to the M2M environment and specified by an interworking specification such as oneM2M.

In FIG. 3, the following abbreviations are used:

Node-less AEs: This entity indicates that IN-AEs maybe hosted by an Application Service Provider.

Node: A functional entity that contains at least one Common Services Entity (CSE) and/or one Application Entity (AE). A node may be contained in a physical apparatus, e.g., an M2M device, a Gateway or a Server Infrastructure. In general, CSEs resident in different nodes are not identical and are dependent on the services supported by the CSE in that node. In some embodiments, two types of nodes are defined. One type of node is a functional entity that contains at least one Common Services Entity and/or one or more oneM2M Application Entities. Such nodes may be referred to as CSE-capable nodes. The other type of node is a functional entity that may contain one or more Application Entities, and no Common Service Entity. Such nodes may be referred to as non-CSE-capable nodes. In a oneM2M architecture, a CSE-capable oneM2M node may be contained in a physical object e.g., M2M Device, Gateway or Server Infrastructure. Non-CSE-capable oneM2M node may be contained in physical objects such as sensors, actuators etc. CSE-capable and non-CSE capable nodes communicate over Mca reference Point The Mcc' reference point aims to be as similar as possible to the Mcc reference point. But due to the nature of inter-M2M Service Provider communications, some differences may exist.

Many different types of nodes may exist in the configuration 200. A node is not necessarily mapped to a single actual physical object, although it may be mapped to actual physical objects. The nodes may include:

Application Service Node (ASN): An Application Service Node is a node that contains one Common Services Entity and contains at least one Application Entity. An Application Service Node may communicate over a Mcc reference point with either: exactly one Middle Node; or exactly one Infrastructure Node. Example of physical mapping includes an Application Service Node could reside in an M2M Device.

Application Dedicated Node (ADN): An Application Dedicated Node may contain at least one Application Entity and does not contain a Common Services Entity. An Application Dedicated Node communicates with a Middle Node or an Infrastructure Node over an Mca reference point. Examples of physical mapping include an Application Dedicated Node that could reside in a constrained M2M Device.

Middle Node (MN): A Middle Node is a node that contains one Common Services Entity and contains zero or more Application Entities. A Middle Node communicates with either an IN or another MN over Mcc, plus at least an IN/MN/ASN over Mcc, or an ADN over Mca. Examples of physical mapping may include a Middle Node that could reside in an M2M Gateway.

Infrastructure Node (IN): An Infrastructure Node is a node that contains one Common Services Entity and contains zero or more Application Entities. An Infrastructure Node communicates over respective Mcc reference points with one or more Middle Node(s); and/or one or more Application Service Node(s). In addition, an Infrastructure Node communicates with one or more Application Dedicated Nodes over respective Mca reference points. Example of physical mapping: an Infrastructure Node could reside in an M2M Server Infrastructure.

M2M External Identifier (M2M-Ext-ID)

The M2M-Ext-ID is used by an M2M SP when services targeted to a CSE, identified by a CSE-ID, are requested from the underlying network.

The M2M External Identifier allows the underlying network to identify the M2M device associated with the CSE-ID for the service request. To that effect, the underlying network maps the M2M-Ext-ID to the UNet-specific Identifier it allocated to the target M2M Device. In addition, the M2M SP can maintain the association between the CSE-ID, the M2M-Ext-ID and the identity of the UNet.

In various embodiments, both pre-provisioned and dynamic association between the CSE-ID with the M2M-Ext-ID can be implemented.

For each CSE-ID, there should be only one M2M-Ext-ID for a specific underlying network identifier, or UNetwork-ID. Hence an M2M SP interworking with multiple underlying networks will have different M2M-Ext-IDs associated with the same CSE-ID, one per underlying network and will select the appropriate M2M-Ext-ID for any service request it initiates towards an underlying network.

In general, the mapping by the UNet of the M2M-Ext-ID to the M2M Device is UNet-Specific.

In some configurations, the UNet provider and the M2M Service Provider may collaborate for the assignment of an M2M-Ext-ID to each CSE identified by CSE-ID. At the same time, the UNet provider maintains association of the M2M-Ext-ID with the UNet-specific Identifier allocated to the M2M device that hosts such CSE.

For pre-provisioned M2M-Ext-IDs, the M2M-Ext-ID along with the associated CSE-ID may be provisioned at the Infrastructure Node. The CSE at an M2M device does not need to have knowledge of the M2M-Ext-ID assigned to it. For dynamic M2M-Ext-IDs, the M2M-Ext-ID specific to the Underlying Network is provisioned at each M2M device in the Field Domain. Such M2M-Ext-ID is conveyed to the IN-CSE during CSE Registration.

Trigger Recipient Identifier (Trigger-Recipient-ID)

The Trigger-Recipient-ID is used when device triggering services are requested from the UNet, to identify an instance of an ASN/MN-CSE on an execution environment, to which the trigger is to be routed. For example, when 3GPP device triggering is used, the Trigger-Recipient-ID would map to the Application-Port-Identifier, e.g., specified in the Specification 3GPP 23.682.

For pre-provisioned M2M-Ext-IDs, Trigger-Recipient-ID is provisioned at the Infrastructure Node along with the M2M-Ext-ID and the associated CSE-ID. For dynamic M2M-Ext-IDs, Trigger-Recipient-ID specific to the underlying network is provisioned at each M2M device in the Field Domain. Such Trigger-Recipient-ID is conveyed to the IN-CSE during CSE Registration.

Table 1 below lists examples of certain M2M identifiers and their usage properties. In particular, as listed in Table 1, the external identifier is jointly assigned between UNet provider and the M2M SP, and assigned to the M2M node belonging to the CSE that wants to utilize the services of the UNet and may have two provisioning modes—a pre-provisioning mode and a dynamic mode in which the external identifier is conveyed during the registration of the corresponding CSE.

M2M Identifiers lifecycle and characteristics

TABLE 1

| Identifier | Assigned by | Assigned to | Assigned during | Lifetime | Uniqueness | Used during | Remarks |
|---|---|---|---|---|---|---|---|
| M2M Service Provider Identifier | Out of scope | AE, CSE | Out of scope | Out of scope | Global | Provisioning | |
| Application Entity Identifier | AE or Registrar CSE | AE | AE start-up | Application Entity Registration | Global | Application Entity Registration Security Context Establishment All other operations initiated by the AE | Security requirements apply for Security Context Establishment |

TABLE 1-continued

| Identifier | Assigned by | Assigned to | Assigned during | Lifetime | Uniqueness | Used during | Remarks |
|---|---|---|---|---|---|---|---|
| Application Identifier | Out of scope | Out of scope | Pre-provisioned | Out of scope | Specific to M2M service deployment | Application Entity registration | |
| CSE Identifier | M2M SP | CSE | Security Provisioning | Life of the CSE | Global | Information flows (clause 10) Security Context Establishment | Security requirements apply for Security Context Establishment |
| M2M Node Identifier | Out of Scope | M2M Node hosting CSE | Pre-provisioned | Life of the M2M Node | Global | Device Management | Needs to be Read Only |
| M2M Subscription Identifier | M2M SP, Out of Scope | Application Entities, and one or more CSEs belonging to the same M2M subscriber | At service signup | Life of the M2M Service Subscription with the MM SP | Global | Charging and Information Recorded Role based access control Authentication | Multiple CSEs can be allocated the same M2M Subscription Identifier |
| M2M-Request-ID | Mcc: CSE Mca: Application Entity | A request initiated by an AE or CSE | Mcc: When a request is initiated by a CSE, or handling of a request received by a CSE. Mca: When a request is initiated by an AE | Equal to the lifetime of the Request and its corresponding Response | Mcc: Global Mca: Local or global | Requests and corresponding responses | |
| External Identifier | Jointly between the Underlying Network provider and M2M SP, where applicable. | M2M Node belonging to a CSE that wants to utilize services of the Underlying Network. | Administrative Agreement. | Life of the CSE. | Local or global, decided by the specific Underlying Network provider | Requests initiated by a CSE over the Mcn reference point, where applicable. | Pre-Provisioned Mode: Provisioned at the Infrastructure Node. Dynamic Mode: Provisioned at M2M device. Conveyed to IN-CSE during CSE Registration. |
| Underlying Network Identifier | M2M SP | Underlying Networks | Pre-provisioned | Life of the Underlying Network | Local to M2M SP domain | UL Network selection | |
| Trigger Recipient Identifier | Execution Environment | ASN/MN-CSE | ASN/MN-CSE start-up or wake-up | Life of the CSE | Execution Environment-wide | Device Triggering procedures, where applicable | Pre-Provisioned Mode: Provisioned at Infrastructure Node along with M2M-Ext-ID Dynamic Mode: Provisioned at M2M device. Conveyed to IN-CSE |

TABLE 1-continued

| Identifier | Assigned by | Assigned to | Assigned during | Lifetime | Uniqueness | Used during | Remarks |
|---|---|---|---|---|---|---|---|
| | | | | | | | during CSE Registration along with M2M-Ext-ID |
| M2M Service Identifier | M2M Service Provider, Out of Scope | A service defined by the M2M Service Provider which consists of a set of functions | | | Local to the M2M Service Provider | For M2M Service Subscription | |

Resource Type CSEBase

A <CSEBase> resource can be used to represent a CSE. This <CSEBase> resource may be the root for all the resources that are residing on the CSE.

Figure 4A:
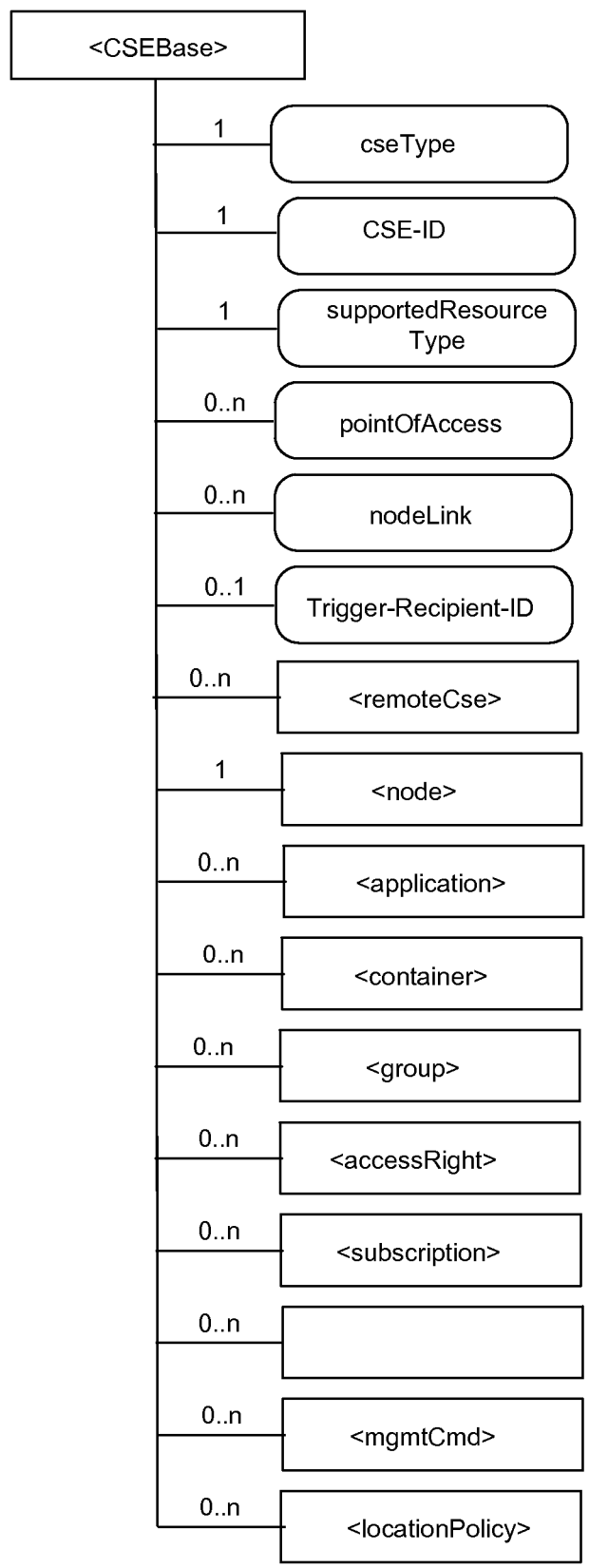
FIG. 4A shows an example of a CSEBase resource.

FIG. 4A shows an example listing of attributes included in a CSEBase resource.

The <CSEBase> resource may contain the child resources in Table 2.

TABLE 2

| Child Resource Name of <CSEBase> | Child Resource Type | Multiplicity | Description |
|---|---|---|---|
| [variable] | <remoteCSE> | 0 . . . n | |
| [variable] | <node> | 0 . . . n | |
| [variable] | <AE> | 0 . . . n | |
| [variable] | <container> | 0 . . . n | |
| [variable] | <group> | 0 . . . n | |
| [variable] | <accessControlPolicy> | 0 . . . n | |
| [variable] | <subscription> | 0 . . . n | |
| [variable] | <mgmtCmd> | 0 . . . n | |
| [variable] | <locationPolicy> | 0 . . . n | |
| [variable] | <statsConfig> | 0 . . . n | |
| [variable] | <statsCollect> | 0 . . . n | |

The <CSEBase> resource may contain the attributes described in Table 3.

TABLE 3

| Attribute Name of <CSEBase> | Multiplicity | RW/RO/WO | Description |
|---|---|---|---|
| resourceType | 1 | RO | |
| creationTime | 1 | RO | |
| lastModifiedTime | 1 | RO | |
| accessControlPolicies | 0 . . . 1 | RW | |
| labels | 0 . . . 1 | RW | |
| cseType | 1 | WO | Indicates the type of CSE node represented by the created resource. |
| CSE-ID | 1 | WO | The globally unique CSE identifier. |
| supportedResourceType | 1 | RO | List of the resource types which are supported in CSE. |
| pointOfAccess | 0 . . . n | RW | Represents the list of physical addresses to be used by remote CSEs to connect to this CSE (e.g., IP address, FQDN). This attribute is used to announce its value to remote CSEs. |
| nodeLink | 0 . . . 1 | RO | A reference (URI) of a <node> resource that stores the node specific information. |
| M2M-Ext-ID | 0 . . . 1 | RW | Supported at ASN-CSE/MN-CSE only. See clause 7.1.8 where this attribute is described. This attribute is used only in case of dynamic association of M2M-Ext-ID and CSE-ID |
| Trigger-Recipient-ID | 0 . . . 1 | RW | Supported at ASN-CSE/MN-CSE only. This attribute is used only in case of dynamic association of M2M-Ext-ID and CSE-ID |
| notificationCongestion Policy | 0 . . . 1 | RO | This attribute applies to CSEs generating subscription notifications. It specifies the rule which is applied when the storage of notifications for each subscriber (an AE |

TABLE 3-continued

| Attribute Name of <CSEBase> | Multiplicity | RW/ RO/ WO | Description |
|---|---|---|---|
| | | | or CSE) reaches the maximum storage limit for notifications for that subscriber. E.g., Delete stored notifications of lower notificationStoragePriority to make space for new notifications of higher notificationStoragePriority, or delete stored notifications of older creationTime to make space for new notifications when all notifications are of the same notificationStoragePriority. |

Resource Type remoteCSE

A <remoteCSE> resource represents a remote CSE that is registered to the Registrar CSE. The <remoteCSE> resources may be located directly under the <CSEBase>. Conversely each registered CSE may also be represented as a sub-set of <remoteCSE> resource in the registering CSE's <CSEBase>. For example, when CSE1 registers with CSE2, there will be two <remoteCSE> resources created: one in CSE1<CSEBase1>/<remoteCSE2> and one in CSE2 <CSEBase2>/<remoteCSE1>. The creation of the two resources does not necessarily imply mutual registration. The <CSEBase1>/<remoteCSE2> does not automatically mean CSE2 registered with CSE1 in the example above.

The <remoteCSE> resource may include child resources, e.g., as listed in Table 4.

Figure 4B:
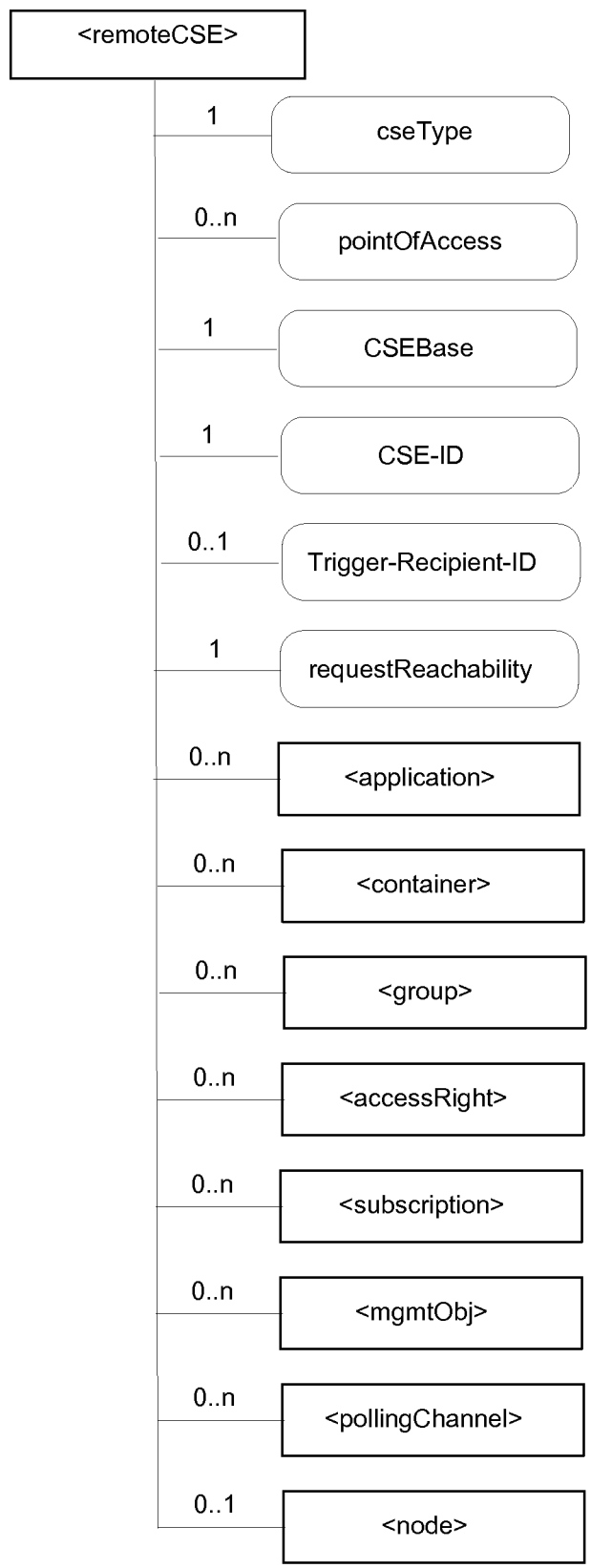
FIG. 4B shows an example of a remoteCSE resource.

FIG. 4B lists an example of child resources included with a <remoteCSE> resource.

TABLE 4

| Child Resource Name of <remoteCSE> | Child Resource Type | Multiplicity | Description | <remoteCSEAnnc> Child Resource Types |
|---|---|---|---|---|
| [variable] | <AE> | 0 . . . n | | AE <AEAnnc> |
| [variable] | <container> | 0 . . . n | | <container> <containerAnnc> |
| [variable] | <group> | 0 . . . n | | <group> <groupAnnc> |
| [variable] | <accessControlPolicy> | 0 . . . n | | <accessControlPolicy> <accessControlPolicyAnnc> |
| [variable] | <subscription> | 0 . . . n | | <subscription> |
| [variable] | <pollingChannel> | 0 . . . n | If requestReachability is FALSE, the CSE that created this <remoteCSE> should create a <pollingChannel> resource and perform long polling. | <pollingChannel> |
| [variable] | <schedule> | 0 . . . 1 | This resource defines the reachability schedule information of the node. | <scheduleAnnc> |

In some embodiments, the <remoteCSE> resource may include attributes listed in Table 5.

TABLE 5

| Attribute Name of <remoteCSE> | Multiplicity | RW/ RO/ WO | Description | <remoteCSEAnnc> Attributes |
|---|---|---|---|---|
| resourceType | 1 | RO | | NA |
| parentID | 1 | RO | | NA |
| creationTime | 1 | RO | | NA |
| lastModifiedTime | 1 | RO | | NA |
| expirationTime | 1 | RW | | MA |
| accessControlPolicies | 0 . . . n | RW | | MA |
| labels | 0 . . . 1 | RW | | MA |
| announceTo | 1 | RW | | NA |
| announcedAttribute | 1 | RW | | NA |
| cseType | 1 | WO | Indicates the type of CSE node represented by the created resource. | OA |
| pointOfAccess | 0 . . . n | RW | For request-reachable remote CSE it represents the list of physical addresses to be used to connect to it | OA |

TABLE 5-continued

| Attribute Name of <remoteCSE> | Multiplicity | RW/ RO/ WO | Description | <remoteCSE Annc> Attributes |
|---|---|---|---|---|
| | | | (e.g., IP address, FQDN). The attribute is absent if the remote CSE is not request-reachable. | |
| CSEBase | 1 | WO | The URI of the CSEBase of the original CSE represented by remote CSE. | OA |
| CSE-ID | 1 | WO | The globally unique CSE identifier. | OA |
| M2M-Ext-ID | 0 . . . 1 | RW | Supported at IN-CSE only. This attribute is used only in case of dynamic association of M2M-Ext-ID and CSE-ID | NA |
| Trigger-Recipient-ID | 0 . . . 1 | RW | Supported at IN-CSE only. This attribute is used only in case of dynamic association of M2M-Ext-ID and CSE-ID | NA |
| requestReachability | 1 | RW | If the CSE that created this <remoteCSE> can receive a request from other AE/CSE(s), this attribute is set to "TRUE" otherwise "FALSE". Even if this attribute is set to "FALSE", it may not mean it AE/CSE is always unreachable by all entities. E.g., the requesting AE/CSE is behind the same NAT, so it can communicate within the same NAT. | OA |
| nodeLink | 0 . . . 1 | RO | Reference URI of a <node> resource that stores node specific information. | OA |

In some embodiments, <remoteCSE> and announced <remoteCSE> will have different resourceType coding for implementations to be able to discern between the two resources.

Example Embodiments for Implementations in oneM2M Systems

Examples of modifications are provided to explain how the current oneM2M specification can be modified, in some embodiments, to implement some of the techniques disclosed in the present document. The examples disclose, among other things, changes made to current procedures specified in oneM2M for creating and deleting announced attributes from an application entity or a common services entity (CSE), and also disclose new techniques for announcing and de-announcing attributes by an original resource hosting CSE.

Some modifications are suggested to propose methods for supporting attribute announcement and de-announcement. Attribute announcement/de-announcement is supported by the use of UPDATE and DELETE operations.

Example 1

10.2.18.6 Procedure for AE and CSE to initiate the Creation of an Announced Attribute This clause describes the procedure for an AE and CSE to initiate the creation of an announced attribute (attribute announcement).

Originator: The Originator of a Request, for initiating attribute announcement, can be either AE or CSE. The Originator may request attribute announcement by updating the announcedAttribute attribute at the original resource:

The Originator may update the announcedAttribute attribute at the original resource by adding to it the attributes that need to be announced by using the UPDATE Request. Only the attributes marked with OA can be announced to remote announced resources.

Receiver: Once the Originator has been successfully authorized, the Receiver, which may be the original resource hosting CSE, may grant the Request after successful validation of the Request.

The attributes received in the Request, which are not marked as OA, are invalid.

The attributes received in the Request, which are not present in the original resource structure, are invalid.

If some attributes received in the Request do not already exist in the announcedAttribute attribute, the Receiver may announce such attributes to all announced resources listed in the announceTo attribute as per procedures in clause 10.2.18.8.

On successful announcement of attributes as per procedures in clause 10.2.18.8, the Receiver may perform the following:

The Receiver may respond to the requesting AE/CSE with UPDATE Response as specified in clause 10.1.3. The content of the announced attributes can be provided in such Response.

TABLE 10.2.18.6-1

| Creating Announced Attributes | Description |
|---|---|
| Call Flow Type | UPDATE |
| Pre-Conditions | A resource has already been announced. |
| Information on Request message | Parameters defined in Table 8.1.2.1-1 that are applicable for UPDATE. cn parameter includes the names of the attributes to be announced. |
| Local processing on Hosting CSE | Steps described for the Receiver of the Request as described above |
| Information on Response message | Parameters defined in Table 8.1.2.1-1 that are applicable. |
| Post-Conditions | None |

TABLE 10.2.18.6-1-continued

Creating Announced Attributes
Description

| | |
|---|---|
| Exceptions | All exceptions described in the basic procedures in clause 10.1.3 are applicable. |

Example 1B 10.2.18.6 Procedure for original resource hosting CSE to De-announce the Announced Attribute In this section, the procedure for de-announce the announced attribute(s) (i.e., the attribute de-announcement) is explained. This procedure can be used by the original resource hosting CSE to de-announce the announced attribute(s) that resides in the announced resource(s) in the remote CSE(s).

Originator: The Originator of this Request can be the original resource hosting CSE. The Originator can request to de-announce the announced attribute(s) by using the UPDATE Request. cn may include the attribute(s) to be de-announced with its value set to NULL.

Receiver: On receiving the Request, the Receiver can perform as follows: (1) Check whether the Originator is authorized for the Request, and further check whether the Request is valid. (2) If the Originator is authorized for the Request and the Request is valid, then de-announce the announced attribute(s) identified by the cn parameter in the Request by setting its value to NULL. (3) Respond to the Originator with the appropriate generic Response.

Originator after receiving the Response from the Receiver: On receiving the Response, the Originator can perform as follows: If the de-announced attribute(s) is successfully de-announced, then the announcedAttribute attribute in the original resource can be updated accordingly to delete the attribute name(s) that was de-announced.

TABLE 10.2.18.6-1

Original Resource Hosting CSE to De-Announce Attribute: UPDATE
Description

| | |
|---|---|
| Call Flow Type | UPDATE |
| Pre-Conditions | None |
| Information on Request message | Information described for the Originator of the UPDATE Request as described above: cn: attribute(s) to be de-announced with its value set to NULL |
| Local processing on Hosting CSE | Steps described for the Receiver as described above |
| Information on Response message | No change to the generic procedure |
| Post-Conditions | Steps described for the 'Originator on receiving the Response from the Receiver' as described above |
| Exceptions | Local processing on the Receiver: The Request is invalid as described above |

Example 2

10.2.18.7 Procedure for AE and CSE to initiate the Deletion of an Announced Attribute This clause describes the procedure for an AE and CSE to initiate the deletion of an announced attribute (attribute de-announcement).

Originator: The Originator of a Request, for initiating attribute de-announcement, can be either AE or CSE. The Originator may request attribute de-announcement by updating the announcedAttribute attribute at the original resource as follows:

The Originator may update the announcedAttribute attribute at the original resource by deleting from it the attributes that need to be de-announced by using the UPDATE Request. Only the attributes marked with OA can be de-announced to remote announced resources.

Receiver: Once the Originator has been successfully authorized, the Receiver, which may be the original resource hosting CSE, may grant the Request after successful validation of the Request.

The attributes received in the Request, which are not marked as OA, are invalid.

If some attributes that exist in the announcedAttribute attribute are not received in the Request, the Receiver may de-announce such attributes to all announced resources listed in the announceTo attributes as per procedure in clause 10.2.18.9.

On successful de-announcement of all attributes as per procedures in clause 10.2.18.9, the Receiver may perform the following:

The Receiver may respond to the requesting AE/CSE with UPDATE Response as specified in clause 10.1.3. The names of the de-announced attributes can be provided in such Response.

TABLE 10.2.18.7-1

Deleting Announced Attributes
Description

| | |
|---|---|
| Call Flow Type | UPDATE |
| Pre-Conditions | A resource has already been announced. |
| Information on Request message | Parameters defined in Table 8.1.2.1-1 that are applicable for UPDATE.. cn parameter does not include the names of the attributes to be de-announced. |
| Local processing on Hosting CSE | Steps described for the Receiver of the Request as described above |
| Information on Response message | Parameters defined in Table 8.1.2.1-1 that are applicable. |
| Post-Conditions | None |
| Exceptions | All exceptions described in the basic procedures in clause 10.1.3 are applicable. |

Example 3

10.2.18.8 Procedure for original resource hosting CSE for Announcing Attributes

This clause describes procedure that may be used by the original resource hosting CSE to create announced attributes at the remote announced resources (i.e., the attribute announcement).

Originator: The Originator of this Request may be the original resource hosting CSE. The Originator may request to create announced attributes at the announced resources by using the UPDATE Request as specified in clause 10.1.3.

Receiver: Once the Originator has been successfully authorized, the Receiver (CSE hosting announced resource) may grant the Request after successful validation of the Request. The Receiver may perform as follows:

Create announced attributes at the announced resource as per procedures for partial addressing in clause 10.1.3.

Respond to the Originator with UPDATE Response as in clause 10.1.3.

Originator after receiving the Response from the Receiver may perform the following steps: If the announced attributes have been successfully created, the announcedAttribute attribute may be updated to include the attribute names for the successfully announced attributes.

For the newly announced attributes in the announcedAttribute attribute, the Originator may take the responsibility to keep their values synchronized at the announced resources by using UPDATE operation as in clause 10.1.3.

TABLE 10.2.18.8-1

Original Resource Hosting CSE to Announce Attribute: UPDATE Description

| | |
|---|---|
| Call Flow Type | UPDATE |
| Pre-Conditions | Only the attribute marked with OA can be announced. |
| Information on Request message | Information described for the Originator of the UPDATE Request as in clause 10.1.3. |
| Local processing on Hosting CSE | Steps described for the Receiver of the UPDATE Request as described in clause 10.1.3. |
| Information on Response message | Steps described for the Receiver of the UPDATE Request as described in clause 10.1.3. |
| Post-Conditions | Steps described for the 'Originator on receiving the Response from the Receiver' as described in clause 10.1.3 |
| Exceptions | All exceptions described for the basic procedure in clause 10.1.3. |

Example 4

10.2.18.9 Procedure for original resource hosting CSE for De-Announcing Attributes This clause describes procedure that may be used by the original resource hosting CSE to remove announced attributes at remote announced resources (i.e., the attribute de-announcement).

Originator: The Originator of this Request may be the original resource hosting CSE. The Originator may request to delete an announced attribute by using the DELETE Request as specified in clause 10.1.4.

Receiver: Once the Originator has been successfully authorized, the Receiver (CSE hosting announced resource) may grant the Request after successful validation of the Request. The Receiver may perform as follows:

Delete the de-announced attribute as per procedures for partial addressing in clause 10.1.4.

Respond to the Originator with the appropriate DELETE Response as in clause 10.1.4.

Originator after receiving the Response from the Receiver may perform the following steps: If the de-announced attribute has been successfully removed, the announced Attribute attribute may be updated so as to remove the attribute name for the successfully de-announced attribute.

TABLE 10.2.18.9-1

Original Resource Hosting CSE to De-Announce Attribute: DELETE Description

| | |
|---|---|
| Call Flow Type | DELETE |
| Pre-Conditions | Only the attribute marked with OA can be de-announced |
| Information on Request message | Information described for the Originator of the DELETE Request as in clause 10.1.4. |
| Local processing on Hosting CSE | Steps described for the Receiver of the DELETE Request as described in clause 10.1.4. |
| Information on Response message | Steps described for the Receiver of the DELETE Request as described in clause 10.1.4. |
| Post-Conditions | Steps described for the 'Originator on receiving the Response from the Receiver' as described in clause 10.1.4. |

TABLE 10.2.18.9-1-continued

Original Resource Hosting CSE to De-Announce Attribute: DELETE Description

| | |
|---|---|
| Exceptions | All exceptions described for the basic procedure in clause 10.1.3. |

Possible modifications to current oneM2M specification proposes support for Partial Addressing in oneM2M. Such partial addressing is proposed to be supported by the use of UPDATE and DELETE operations.

Example 5

8.1.1 Description

Figure 5:
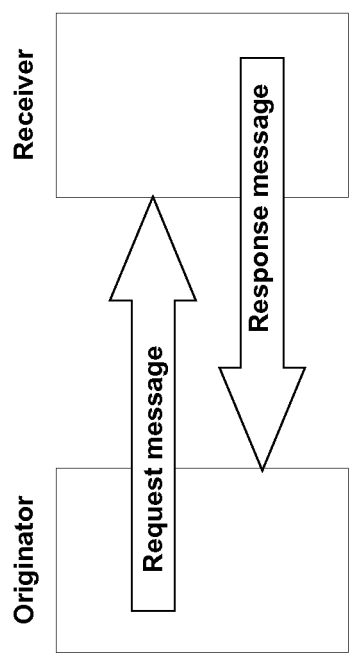
FIG. 5 illustrates an example of information flow in an M2M system.

FIG. 5 shows an exemplary diagram showing a general flow of communications that governs the information exchange within a procedure, which is based on the use of Request and Response scheme. The scheme applies to communications such as:

between an AE and a CSE (Mca reference point); and
among CSEs (Mcc reference point).

The communications can be initiated either by AEs or by CSEs depending upon the operation in the Request message.

8.1.2 Request

Request from an Originator to a Receiver includes the following information:

to: URI of the target resource or the target attribute for the operation. The to information may conform to clause 9.3.1.

The to target resource or target attribute needs to be known by the Originator. It can be known either by pre-provisioning or by discovery.

The term target resource always refers to the resource which is addressed for the specific operation. For example the to parameter of a Create operation for a resource "example" would be "/m2m.provider.com/exampleBase". The to parameter for the Retrieve operation of the same resource "example" is "/m2m.provider.com/exampleBase/example". When used for addressing a specific attribute with RETRIEVE operation, the to parameter for "container" attribute in the above example is "/m2m.provider.com/exampleBase/example/container".

fr: Identifier representing the Originator.

The fr information may be used by the Receiver to check the Originator identity for access privilege verification.

cn: resource content to be transferred.

op: operation to be executed: Create (C), Retrieve (R), Update (U), Delete (D).

The op information may indicate the operation to be executed at the Receiver:

Create (C): a new resource addressable with to parameter is created.

Retrieve (R): an existing to addressable resource is read and provided back to the Originator.

Update (U): the content of an existing to addressable resource is replaced with the new content as in cn parameter. If some attributes in the cn parameter do not exist at the target resource, such attributes are created with the assigned values.

Delete (D): an existing to addressable resource and all its sub-resources are deleted from the resource storage. For to parameter addressing a specific attribute, such attribute is deleted from the resource storage.

Notify (N): information to the Receiver, processing on the Receiver is not indicated by the Originator.

The ty information may be present in Request for the following operations:

Create: ty is the type of the resource to be created.
cn: resource content to be transferred.

The cn information may be present in Request for the following operations:

Create: cn is the content of the new resource with the resource type tag as in Table 9.2-1.

Update: cn is the content to be replaced in an existing resource. cn can also include new attributes with their associated values for attributes to be created at the resource addressed by the to parameter.

Retrieve: cn is the filter to be applied for discovery purposes.

Notify: cn is the notification information.

Note that the cn information can also be empty.

Other allowed information may be as follows:

nm: optional name of the resource to be created.

Example usage of the name includes a name that the Originator of the Create resource wishes to be used as the identifier of the newly created resource. For creating a container with the name "myContainer" the request will provide the parameter nm with the value "myContainer" and the created resource would be: /<SCEBase>/myContainer.

ot: optional originating timestamp of when the message was built.

Example usage of the originating timestamp includes: to measure and enable operation (e.g. message logging, correlation, message prioritization/scheduling, accept performance requests, charging, etc.) and to measure performance (distribution and processing latency, closed loop latency, SLAs, analytics, etc.)

rqet: optional request message expiration timestamp.

Example usage of the request expiration timestamp includes to indicate when request messages (including delay-tolerant) should expire due to their staleness being no longer of value, and to inform message scheduling/prioritization. When a request has set request expiration timestamp to a specific time and the Request demands an operation on a Hosting CSE that is not the CSE currently processing the request, then the current CSE may keep on trying to deliver the Request to the Hosting CSE until the request expiration timestamp time, in line with provisioned policies.

rset: optional result message expiration timestamp.

Example usage of the result expiration timestamp includes to indicate when result messages (including delay-tolerant) should expire due to expected staleness of the result, being no longer of value, and to inform message scheduling/prioritization. It can be used to set the maximum allowed total request/result message sequence round trip deadline.

rt: optional response message type: indicates what the response to the issued request may contain and when the response is sent to the Originator:

Acknowledgement: In case the request is accepted by the Local CSE, the Local CSE responds after acceptance with an Acknowledgement confirming that the Local CSE will further process the request.

Result: In case the request is accepted by the Local CSE, the Local CSE responds with the result of the requested operation after completion of the requested operation.

Example usage of the response type set to Acknowledgment: An Originator that is optimized to minimize communication time and energy consumption wants to express a Request to the local CSE and get an acknowledgement on whether the Request got accepted. After that the Originator may switch into a less power consuming mode and retrieve a Result of the requested Operation at a later time.

rd: optional result message destination:

Local CSE: The Local CSE includes in the response to an accepted request a reference that can be used to access the status of the request and the result of the requested operation at a later time.

Originator: The result of the requested operation needs to be sent as a notification to the Originator.

Example usage of the result destination set to Local CSE includes when the result content is extremely large, or when the result consists of multiple content parts from a target group which are to be aggregated asynchronously over time.

rc: optional result message content: Indicates what are the expected components of the result of the requested operation. The Originator of a request may not need to get back a result of an operation at all. This may be indicated in the rc information. Which exact settings of rc are possible depends on the requested operation specified in op. Possible values of rc are:

"resource": Only a representation of the requested resources will be returned as content, without any mention of the links of the requested resources to other resources. This is the default value.

"resource;links": A representation of the requested resources, along with all links to other resources (possibly limited by a maximum number of retrieved links), will be returned as content.

"links": Only the links of the requested resources to other resources (possibly limited by a maximum number of retrieved links), without any representation of the actual resources requested, will be returned as content.

"nothing": Nothing will be returned as content of the Response.

"result-notification": A notification will be returned when the operation is completed.

Edition Note: Details on what settings for rc are possible can be added at a later when the specific operations that can be requested are defined (e.g. register an AE, modify content of a container, etc.)

rp: optional response persistence: indicates the duration for which the address containing the responses is to persist.

Example usage of response persistence includes requesting sufficient persistence for analytics to process the response content aggregated asynchronously over time. If a result expiration timestamp is specified then the response persistence should last beyond the result expiration time.

ri: request Identifier

Example usage of request identifier includes enabling the correlation between a Request and one of the many received Responses.

oet: optional operational execution time: indicates the time when the specified operation op is to be executed by the target CSE. A target CSE may execute the specified operation of a Request having its operational execution time indicator set, starting at the operational execution time. If the execution time has already passed or if the indicator is not set, then the specified operation may be immediately executed, unless the request expiration time, if set, has been reached.

Example usage of operational execution time includes asynchronous distribution of flows, which are to be executed synchronously at the operational execution time.

NOTE 4: Time-based flows may not be able to be supported depending upon time services available at CSEs.

ec: optional event category: Indicates the event category that should be used to handle this request. Event categories are impacting how Requests to access remotely hosted resources are processed in the CMDH CSF. Selection and scheduling of connections via CMDH are driven by policies that can differentiate event categories.

Example usage of "event category" set to specific value X: When the request is demanding an operation to be executed on a Hosting CSE that is different from the Local CSE, the request may be stored in the CSE that is currently processing the request on the way to the Hosting CSE until it is allowed by provisioned policies for that event category X to use a communication link to reach the next CSE on a path to the Hosting CSE or until the request expiration timestamp is expired.

da: optional delivery aggregation on/off: Use CRUD operations of <delivery> resources to express forwarding of one or more original requests to the same target CSE(s).

Since da is optional, there could be a default value to be used when not present in the Request. This parameter may not be exposed to AEs via Mca.

Example usage of delivery aggregation set on: The CSE processing a request may use aggregation of requests to the same target CSE by requesting CREATE of a <delivery> resource on the next CSE on the path to the target CSE.

gid: optional group request identifier: Identifier added to the group request that is to be fanned out to each member of the group.

fc: optional filter criteria: conditions for filtered retrieve operation are described in Table 8.1.2-1.

TABLE 8.1.2-1

Filter criteria conditions

| Condition tag | Multi-plicity | Matching condition |
|---|---|---|
| createdBefore | 0 . . . 1 | The creationTime attribute of the resource is chronologically before the specified value. |
| createdAfter | 0 . . . 1 | The creationTime attribute of the resource is chronologically after the specified value. |
| modifiedSince | 0 . . . 1 | The lastModifiedTime attribute of the resource is chronologically after the specified value. |
| unmodifiedSince | 0 . . . 1 | The lastModifiedTime attribute of the resource is chronologically before the specified value. |
| expireBefore | 0 . . . 1 | The expirationTime attribute of the resource is chronologically before the specified value. |
| expireAfter | 0 . . . 1 | The expirationTime attribute of the resource is chronologically after the specified value. |
| labels | 0 . . . n | The labels attributes of the resource matches the specified value. |
| resourceType | 0 . . . n | The resourceType attribute of the resource is the same as the specified value. It also allows discriminating between normal and announced resources. |
| sizeAbove | 0 . . . 1 | The contentSize attribute of the <instance> resource is equal to or greater than the specified value. |

TABLE 8.1.2-1-continued

Filter criteria conditions

| Condition tag | Multi-plicity | Matching condition |
|---|---|---|
| sizeBelow | 0 . . . 1 | The contentSize attribute of the <instance> resource is smaller than the specified value. |
| contentType | 0 . . . n | The typeOfContent attribute of the <instance> resource matches the specified value |
| limit | 0 . . . 1 | Limitation the number of matching resources to the specified value. |
| attribute | 0 . . . n | Attribute token name to be provided to reduce the scope of filtering to resource attributes. |

Example usage of filter criteria conditions in a HTTP query: an HTTP GET operation can be requested applying also a filter in the query part of the request itself:

GET /root?label=one&label=two&createdBefore=2014-01-01T00:00:00&limit=128

The example discovers a maximum of 128 resources matching the following logical condition: createdBefore <2014-01-01T00:00:00 AND (label=one OR label=two).

Once the Request is delivered, the Receiver may analyze the Request to determine the target resource.

If the target resource is addressing another M2M node, the Receiver may route the request appropriately.

If the target resource is addressing the Receiver, it may:

Check the existence of to addressed resource.

Identify the resource type with the tag value as in Table 9.2-1.

Check the privileges for fr Originator to perform the requested operation.

Perform the requested operation (using cn content when provided) according to the provided request parameters as described above.

Depending on the request result content, respond to the Originator with indication of successful or unsuccessful operation results. In some specific cases (e.g. limitation in the binding protocol or based on application indications), the Response could be avoided.

The message flow procedure started with an Originator Request message may be considered closed when either:

A Request message is expired according to the rqet (request expiration timestamp).

A Response message is delivered to the Originator.

8.1.2.1 Summary of Request Message Parameters

Table 8.1.2.1-1 summarises the parameters specified in clause 8.1.2 for the Request message, showing any differences as applied to C, R, U, D or N operations. "M" indicates mandatory, "O" indicates optional, "N/A" indicates "not applicable".

TABLE 8.1.2.1-1

Summary of Request Message Parameters

| Request message parameter\Operation | Create: a new resource is created | Retrieve: an existing resource is read and the result is provided | Update: the content of an existing resource is replaced with new content | Delete: an existing resource and all its sub-resources are deleted | Notify: the content/address is transferred |
|---|---|---|---|---|---|
| Operation (op) - operation to be executed | M | M | M | M | M |
| To (to) - the address of the target resource or the target attribute on the target CSE | M | M | M | M | M |
| From (fr) - the identifier of the message Originator | M | M | M | M | M |
| Request Identifier (ri) - uniquely identifies a Request message | M | M | M | M | M |
| Resource Type (ty) - of resource to be created | M | N/A | N/A | N/A | N/A |
| Name (nm) - of resource to be created | O | N/A | N/A | N/A | N/A |
| Content (cn) - to be transferred | O | O | M | N/A | M |
| Originating Timestamp (ot) - when the message was built | O | O | O | O | O |
| Request Expiration Timestamp (rqet) - when the request message expires | O | O | O | O | O |
| Result Expiration Timestamp (rset) - when the result message expires | O | O | O | O | O |
| Operational Execution Time (oet) - the time when the specified operation is to be executed by the target CSE. | O | O | O | O | O |
| Response Type (rt) - local CSE response may either indicate that the Request was accepted, or include the operation result | O | O | O | O | O |
| Result Destination (rd) - either a reference to where the result is stored, or the result is sent to the Originator | O | O | O | O | N/A |
| Result Persistence (rp) - the duration for which the reference containing the responses is to persist | O | O | O | O | N/A |
| Result Content (rc) - the expected components of the result | O | O | O | O | N/A |
| Event Category (ec) - indicates how and when the system should deliver the message | O | O | O | O | O |
| Delivery Aggregation (da) - aggregation of requests to the same target CSE is to be used | O | O | O | O | O |
| Group Request Identifier (gid) - Identifier added to the group request that is to be fanned out to each member of the group. | O | O | O | O | O |
| Filter Criteria (fc) - conditions for filtered retrieve operation | N/A | O | N/A | N/A | TBD |

Example 6

8.1.3 Successful Operation

For the case of successful completion of a requested operation, the Response from the Receiver to the Originator of that Request includes the following information:

to: Optional. ID of the Originator. In case this is a response carrying the result of an operation triggered by a non-blocking request, "rd" information can be used.

fr: Optional. ID of the Receiver.

rs: operation result: e.g. Okay, Okay and Done; Okay and Scheduled; Okay and In Progress, etc.

cn: optional resource content to be transferred or created (optional).

The meta information includes:

ot: optional originating timestamp of when the message was built.

rset: optional result expiration timestamp. The Receiver may echo the result expiration timestamp if set in the Request message, or may set the result expiration timestamp itself.

Example usage of the Receiver setting the result expiration timestamp is when the value of the delivery time is dependent upon some changing Receiver context eg. Result message deadline for aircraft position based upon velocity.

ri: request Identifier

Note that ri in Response may match the ri in the corresponding Request.

cs: optional, status codes (e.g. authorization timeout, etc.).

ra: optional, address for the temporary storage of end node Responses.

The cn information may be present in a Response in the following cases:

Create: cn is the address and/or the content of the created resource.

Update: cn is the content replaced in an existing resource. cn is the newly created attributes and their values.

Delete: cn is the content actually deleted.

The cn information may be present in a Response in the following cases:

Retrieve: cn is the retrieved resource content or aggregated contents of discovered resources.

8.1.4 Unsuccessful Operation

The Response from the Receiver of a Request to the Originator of the Request, in the case of unsuccessful completion of the requested operation includes the following information:

to: Optional. Identifier the Originator. In case this is a response carrying the result of an operation triggered by a non-blocking request, "rd" information can be used.

fr: Optional. Identifier of the Receiver.

rs: operation result: e.g. Not okay.

cn: optional, status codes (e.g., authorization, timeout, etc.)

The meta information includes:

ot: optional originating timestamp of when the message was built.

rset: optional result expiration timestamp.

ri: Request Identifier.

Note that ri in a Response may match the ri in the corresponding Request.

cs: optional, status codes (e.g. authorization timeout, etc.).

8.1.5 Summary of Response Message Parameters

Table 8.1.5-1 summarizes the parameters specified in clauses 8.1.1 and 8.1.3 for the Response messages, showing any differences as applied to successful C, R, U, D or N operations, and unsuccessful operations. "M" indicates mandatory, "O" indicates optional, "N/A" indicates "not applicable".

TABLE 8.1.5-1

Summary of Response Message Parameters

| | success or not | | | | | |
|---|---|---|---|---|---|---|
| Response message parameter | Successful operation: Create: a new resource is created | Successful operation: Retrieve: an existing resource is read and the result is provided | Successful operation: Update: the content of an existing resource is replaced with new content | Successful operation: Delete: an existing resource and all its sub-resources are deleted | Successful operation: Notify: the content/ address is transferred | Unsuccessful Operation |
| To (to) - the identifier of the Originator | O | O | O | O | O | O |
| From (fr) - the identifier of the Receiver | O | O | O | O | O | O |
| Request Identifier (ri) - uniquely identifies a Request message | M | M | M | M | M | M |
| Result (rs) - operation result: e.g. Okay, Okay and Done; Okay and Scheduled; Okay and In Progress, etc., | M | M | M | M | M | M |
| Status codes (cs) - (e.g., authorization timeout, etc.) | O | O | O | O | O | O |
| Response Address (ra) - address for the temporary storage of end node Responses. | O | O | O | O | N/A | N/A |
| Content (cn) - to be transferred | O (The address and/or the content of | M (the retrieved resource | O (The content replaced in an existing | O (The content actually | N/A | N/A |

TABLE 8.1.5-1-continued

Summary of Response Message Parameters

| Response message parameter | success or not | | | | | |
|---|---|---|---|---|---|---|
| | Successful operation: Create: a new resource is created | Successful operation: Retrieve: an existing resource is read and the result is provided | Successful operation: Update: the content of an existing resource is replaced with new content | Successful operation: Delete: an existing resource and all its sub-resources are deleted | Successful operation: Notify: the content/ address is transferred | Unsuccessful Operation |
| | the created resource) | content or aggregated contents of discovered resources) | resource. The content of the new attributes created). | deleted) | | |
| Originating Timestamp (ot) - when the message was built | O | O | O | O | O | O |
| Result Expiration Timestamp (rset) - when the message expires | O | O | O | O | N/A | O |

Example 7

10.1.3 UPDATE (U)

The UPDATE operation may be used for updating the information stored for any of the attributes at a target resource. Updating needs to be done timely. For example, a failure in refreshing information, for example, "Expiration-Time" may result in the deletion of the resource. The Originator CSE or AE can request to update or create specific attribute(s) at the target resource by including the name of such attribute(s) and their values in the Request message.

Originator requests to update any of the attributes at the target resource by using UPDATE Request message. The Originator may send new (proposed) values for the attribute(s) that need to be updated. The UPDATE operation allows to modify the attributes (defined in clause 9.6) that are indicated as "RW" (Read Write) for the specific resource type.

The Originator requests to create attributes at the target resource by using UPDATE Request message. The Originator may send the name of the attributes to be created (defined in clause 9.6) that are indicated as "RW" (Read Write) for the specific resource type and their associated values in the Request message, See clause 8.1.2 for the information to be included in the Request message.

Receiver once the Originator has been successfully authenticated, the Receiver verifies the existence of the addressed resource, the validity of the attributes provided and the privileges to modify them, may update the attributes provided and may return a Response message to the Originator with the operation results as specified in clause 8.1.3. If the attributes provided do not exist, after verifying the existence of the addressed resource, the Receiver validates the attributes provided and the privileges to create them. On successful validation, the Receiver creates the attributes provided with their associated values and may return a Response message to the Originator with the operation results as specified in clause 8.1.3.

Figure 6:
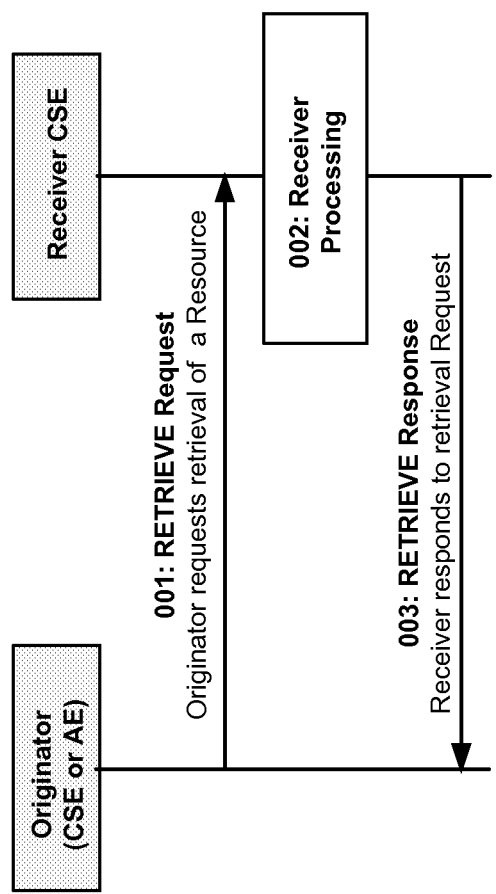
FIG. 6 illustrates an example of messages exchanged during an attribute retrieving procedure.

FIG. 6 illustrates an exemplary procedure for retrieving a resource. In step 001, the Originator may request retrieval of a resource. In step 002, the Receiver may process the request. In step 003, the Receiver may respond to the retrieval request with a Response message.

Figure 7:
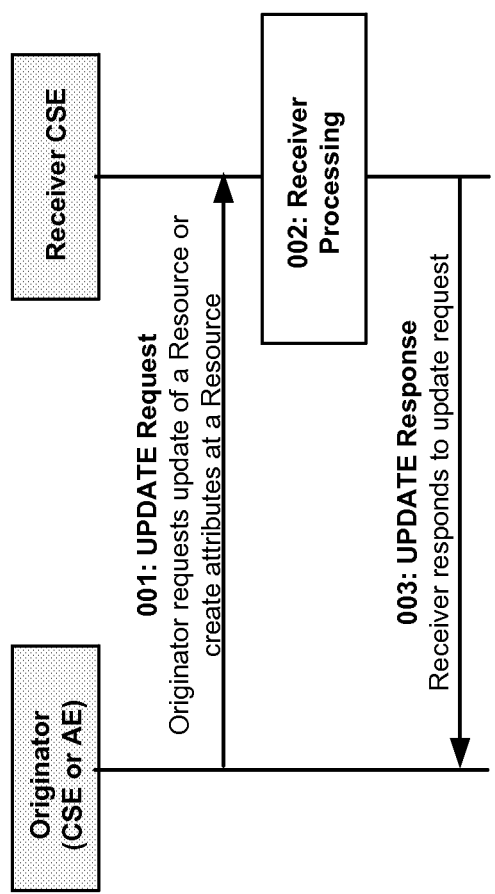
FIG. 7 illustrates an example of messages exchanged during an attribute updating procedure.

FIG. 7 illustrates an exemplary procedure for updating a resource. In step 001, the Originator may send the following information in the UPDATE Request message:

op: U (Update)

to: URI to the target resource fr: ID of the Originator (either the AE or CSE)

cn: Information related to the attribute(s) to be updated or created at the target resource. The name of such attribute(s) and associated updated or assigned values in the cn parameter.

In step 002, the Receiver may validate if the Originator has appropriate privileges to perform the modification to the target resource. On successful validation, the Receiver may update the resource as requested. If the attributes provided do not exist, the Receiver may validate if the Originator has appropriate privileges to create the attributes at the target resource. On successful validation, the Receiver may create the attributes with their associated values at the resource as requested.

In step 003, the Receiver may respond with a Response message that contains the following information:

to: Optional. ID of the Originator. In case this is a response carrying the result of an operation triggered by a non-blocking request, rd information can be used.

fr: Optional. ID of the Receiver.

rs: Operation result cn: Optional. Content replaced or created

General Exceptions:

The targeted resource in to information does not exist. The Receiver responds with an Error.

The Originator does not have the privilege to modify the resource or create attributes on the Receiver. The Receiver responds with Error.

The provided information in the cn is not accepted by the Receiver. The Receiver responds with Error.

Example 8

10.1.4 DELETE (D)

The DELETE operation may be used by an Originator CSE or AE to delete a resource at a Receiver CSE.

The DELETE operation may also be used by the Originator CSE or AE to delete a specific attribute from a target resource at the Receiver CSE.

The DETETE procedure may consist of the deletion of all related information of the target resource.

Originator requests to delete a resource or attribute by using a DELETE Request message.

Receiver once the Originator has been successfully authenticated, the Receiver verifies the existence of the requested resource or attribute, and the privileges for deleting the resource or attribute.

Figure 8:
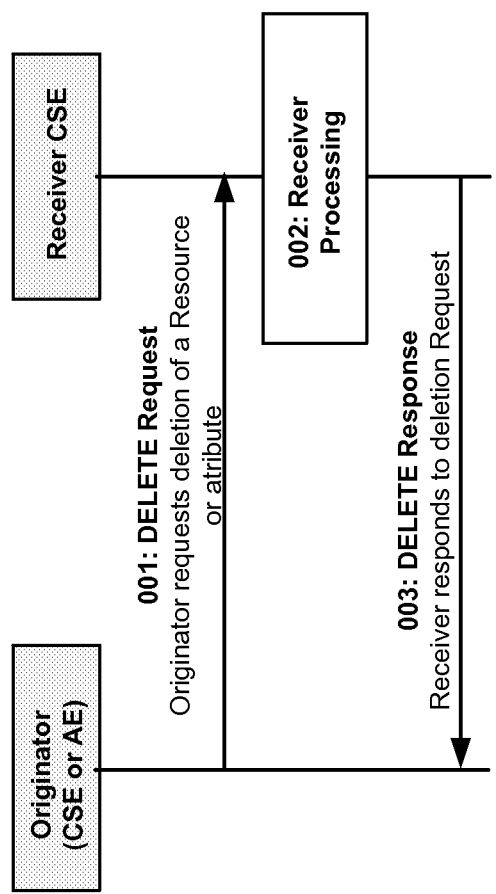
FIG. 8 illustrates an example of messages exchanged during an attribute deleting procedure.

FIG. 8 illustrates an exemplary procedure for deleting a resource or attribute. In step 001: The Originator may send a DELETE Request message to the Receiver.

op: D (Delete)
to: URI of the target resource or attribute
fr: ID of the Originator (either the AE or CSE)

In step 002, the Receiver may verify the existence of the requested resource or attribute and if the Originator has the appropriate privilege to delete the resource/attribute. For the deletion of a resource, on successful validation, the Receiver may check for children resources and delete all children resources and the associated references in parent resources and it may remove the resource itself. For the deletion of an attribute, on successful validation, the Receiver may delete the addressed attribute.

In step 003, the Receiver may respond with a Response message that may contain the following information:

to: Optional. ID of the Originator. In case this is a response carrying the result of an operation triggered by a non-blocking request, rd information can be used.

fr: Optional. ID of the Receiver.
rs: Operation result

General Exceptions:

The targeted resource/attribute in to information does not exist. The Receiver responds with an Error.

The Originator does not have the privileges to delete the resource/attribute on the Receiver. The Receiver responds with an Error.

Exemplary modifications as described above provide examples of how certain sections of the current oneM2M specification can be modified, in some embodiments, to implement some of the techniques disclosed in the present document. Exemplary modifications as described above disclose, among other things, changes made to current procedures specified in oneM2M for exchanging resource or attributes messages of Request, Retrieve, Response, Delete and Update messages. Exemplary modifications as described above also provide additional changes to message parameters and the ways in which these parameters can be used by sending devices and interpreted and acted upon by the receiving devices.

The oneM2M specification which is referenced in the above descriptions, is used as example to illustrate some embodiments and does not limit the scope of the disclosed technology.

Figure 9:
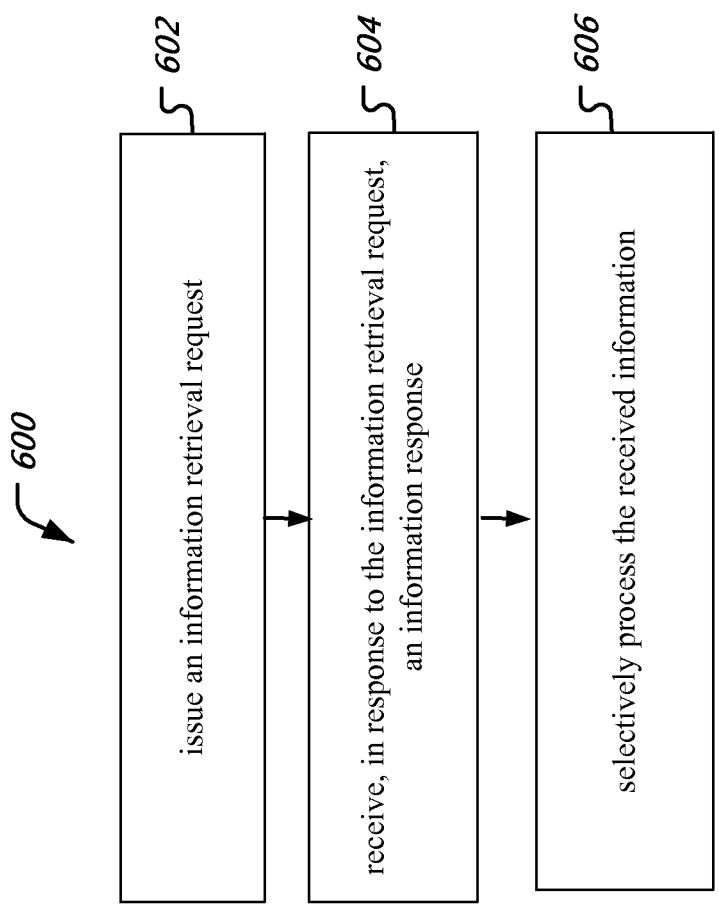
FIG. 9 is a flowchart representation of an example of a method of M2M communication.

As depicted in FIG. 9, in some embodiments, a method 600 for retrieving information from an announced resource in an M2M communication system includes issuing (602) an information retrieval request by specifying an address of an announced resource and including an identity of the announced resource, receiving (604), in response to the information retrieval request, an information response, and selectively processing (606) the received information response locally or forwarding to another M2M device for further processing.

Figure 10:
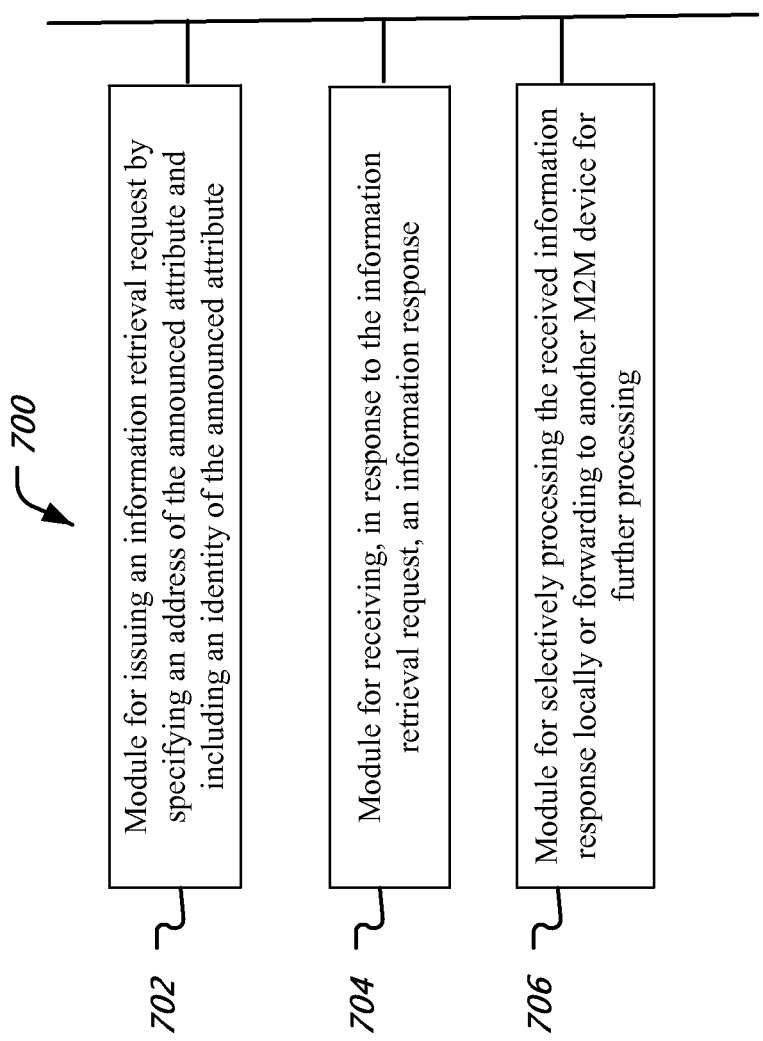
FIG. 10 is a block diagram representation of an example of a M2M communication apparatus.

As depicted in FIG. 10, in some embodiments, an apparatus 700 for retrieving information from an announced resource in an M2M communication system includes a module 702 for issuing an information retrieval request by specifying an address of the announced resource and including an identity of the announced resource, a module 704 for receiving, in response to the information retrieval request, an information response, and a module 706 for selectively processing the received information response locally or forwarding to another M2M device for further processing.

Figure 11:
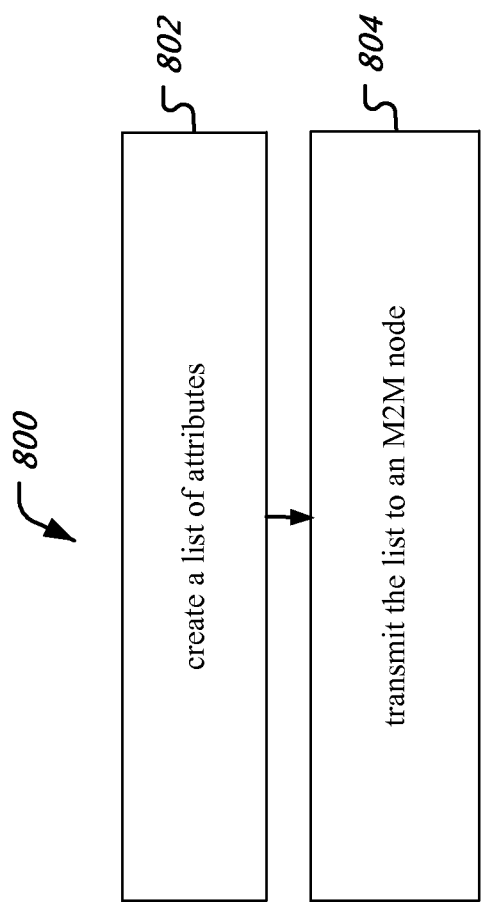
FIG. 11 is a flowchart representation of an example of a method of M2M communication.

As depicted in FIG. 11, in some embodiments, a method 800 for deleting an announced resource in an M2M communication system includes creating (802) a list of attributes of the resource in which an attribute to be deleted is omitted, and transmitting (804) the list to an M2M node that hosts the attribute to be deleted. The method 800 may use technology described herein with respect to FIGS. 1 to 10.

Figure 12:
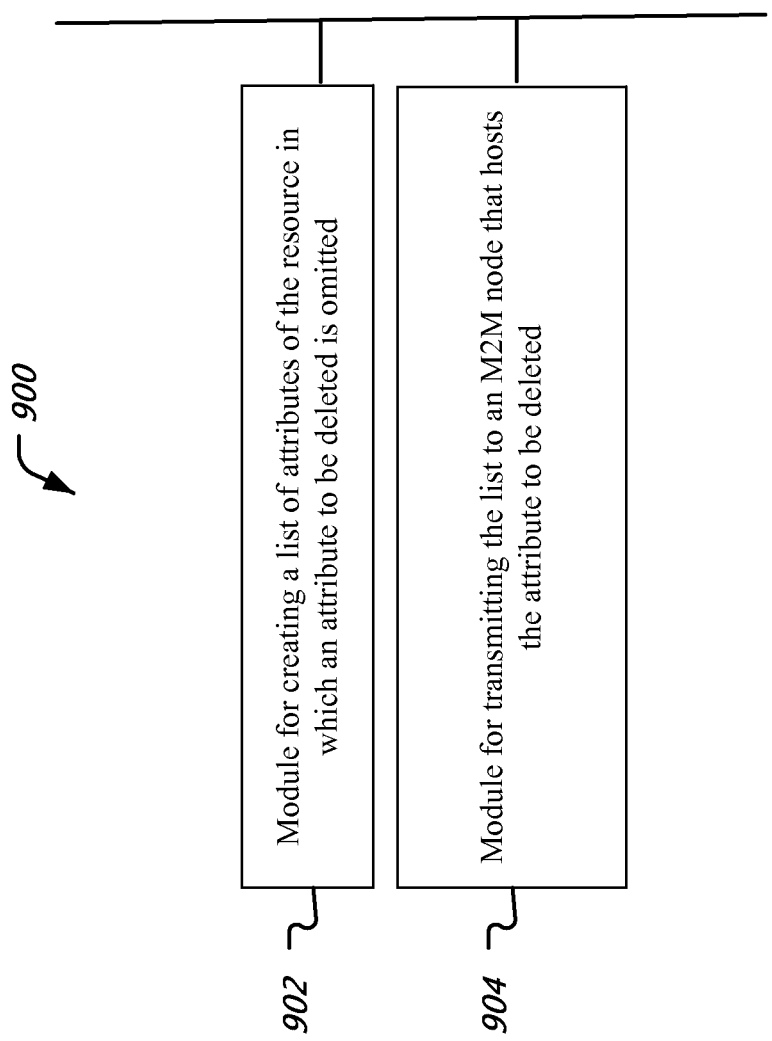
FIG. 12 is a block diagram representation of an example of a M2M communication apparatus.

As depicted in FIG. 12, in some embodiments, an apparatus 900 for deleting an announced resource in an M2M communication system includes a module 902 for creating a list of attributes of the resource in which an attribute to be deleted is omitted, and a module 904 for transmitting the list to an M2M node that hosts the attribute to be deleted.

Figure 13:
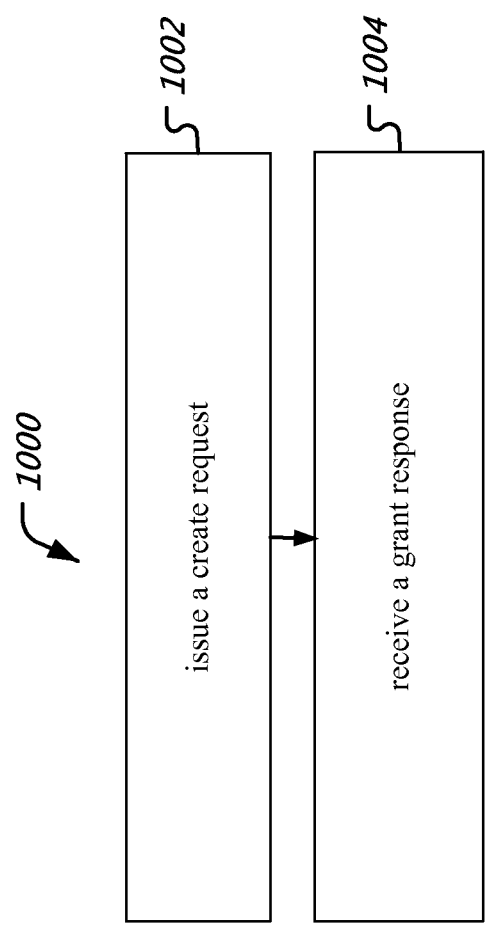
FIG. 13 is a flowchart representation of an example of a method of M2M communication.

As depicted in FIG. 13, in some embodiments, a method 1000 for creating announced resources in an M2M communication system includes issuing (1002) a create request in which attributes originally created by an originating M2M node are listed, and receiving (1004) a grant response for the issued create request. The method 1000 may use technology described herein with respect to FIGS. 1 to 10.

As depicted in FIG. 14, in some embodiments, an apparatus 1100 for creating announced attributes in an M2M communication system includes a module 1102 for issuing a create request in which attributes originally created by an originating M2M node are listed, and a module 1104 for receiving a grant response for the issued create request.

It will be appreciated that techniques for managing resources in a M2M communication system are disclosed.

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of managing an attribute in a machine-to-machine (M2M) communication system, comprising:
    issuing a create request in which attributes originally created by an originator node are listed;
    receiving a grant response for the issued create request;
    issuing an update request on the created attributes and on one or more attributes that do not exist on a target resource, wherein the one or more attributes are included in a resource content parameter of the update request, and wherein the update request includes a first timestamp that indicates when the update request expires;
    receiving a grant response for the issued update request, wherein the grant response for the issued update request allows to update the created attributes at the originator node issuing the update request, wherein the grant response for the issued update request includes a response message that indicates creation of the one or more attributes, and wherein the grant response includes a second timestamp that indicates when the grant response expires;
    issuing a second update request that de-announces at least one attribute from the created attributes or from the one or more attributes, wherein the second update request includes the at least one attribute to be de-announced and a value of the at least one attribute set to null; and
    deleting the at least one attribute in response to receiving a response for the issued second update request, wherein the response indicates a successful de-announcement of the at least one attribute.

2. The method of claim 1, wherein the update request includes URI to the target resource, an identification of the originator node issuing the update request, or information related to the created attributes to be updated or the one or more attributes to be created.

3. The method of claim of claim 2, wherein the information related to the created attributes or the one or more attributes includes names and new proposed values of the created attributes.

4. The method of claim 1, further comprising, in response to not receiving the grant response for the issued update request, issuing another create request for the attributes at the target resource.

5. The method of claim 1, wherein the originator node includes an Application Entity (AE) or a Common Service Entity (CSE).

6. The method of claim of claim 1, wherein the created attributes associated with the update request attributes that are Optional Announced (OA).

7. The method of claim of claim 1, wherein each of the created attributes or each of the one or more attributes are indicated as read-write access for a specific resource type.

8. A Machine-to-Machine (M2M) device to manage an attribute in a M2M communication system, the M2M device comprising a processor configured to:

issue a create request in which attributes originally created by an originator node are listed;
receive a grant response for the issued create request;
issue an update request on the created attributes and on one or more attributes that do not exist on a target resource, wherein the one or more attributes are included in a resource content parameter of the update request, wherein the update request includes a first timestamp that indicates when the update request expires;
receive a grant response for the issued update request, wherein the grant response for the issued update request allows to update the created attributes at the originator node issuing the update request, wherein the grant response for the issued update request includes a response message that indicates creation of the one or more attributes, and wherein the grant response includes a second timestamp that indicates when the grant response expires;
issue a second update request that de-announces at least one attribute from the created attributes or from the one or more attributes, wherein the second update request includes the at least one attribute to be de-announced and a value of the at least one attribute set to null; and
delete the at least one attribute in response to receiving a response for the issued second update request, wherein the response indicates a successful de-announcement of the at least one attribute.

9. The M2M device of claim 8, wherein the update request includes URI to the target resource, an identifier of the originator node, or information related to the created attributes to be updated or the one or more attributes to be created.

10. The M2M device of claim of claim 9, wherein the information related to the created attributes or the one or more attributes includes names and new proposed values of the created attributes.

11. The M2M device of claim 8, wherein the processor is further configured to issue another create request for the attributes at the target resource when the grant response for the issued update request has not been received.

12. The M2M device of claim 8, wherein the M2M device includes a video surveillance camera, a light bulb, a utility box, or a sensor.

13. The M2M device of claim 8, wherein the originator node includes an Application Entity (AE) or a Common Service Entity (CSE).

14. The M2M device of claim 8, wherein the created attributes associated with the update request attributes that are Optional Announced (OA).

15. The M2M device of claim of claim 8, wherein each of the created attributes or each of the one or more attributes are indicated as read-write access for a specific resource type.

* * * * *

UNITED STATES PATENT AND TRADEMARK OFFICE
CERTIFICATE OF CORRECTION

PATENT NO. : 10,616,048 B2  
APPLICATION NO. : 15/126951  
DATED : April 7, 2020  
INVENTOR(S) : Rajesh Bhalla Page 1 of 1

It is certified that error appears in the above-identified patent and that said Letters Patent is hereby corrected as shown below:

In the Specification

In Column 23, Line 55, delete "Originator:" and insert -- Originator. --, therefor.

In Column 26, Line 40, delete "of to addressed" and insert -- of addressed --, therefor.

In Column 31, Line 50, delete "message," and insert -- message. --, therefor.

In Column 35, Lines 46-47, delete "CD ROM" and insert -- CD-ROM --, therefor.

In the Claims

In Column 36, Line 47, in Claim 3, delete "The method of claim of claim" and insert -- The method of claim --, therefor.

In Column 36, Line 59, in Claim 6, delete "The method of claim of claim" and insert -- The method of claim --, therefor.

In Column 36, Line 62, in Claim 7, delete "The method of claim of claim" and insert -- The method of claim --, therefor.

In Column 38, Line 6, in Claim 10, delete "The M2M device of claim of claim" and insert -- The M2M device of claim --, therefor.

In Column 38, Line 23, in Claim 15, delete "The M2M device of claim of claim" and insert -- The M2M device of claim --, therefor.

Signed and Sealed this  
Eleventh Day of August, 2020

Andrei Iancu  
*Director of the United States Patent and Trademark Office*